(12) United States Patent
Park et al.

(10) Patent No.: US 11,743,488 B2
(45) Date of Patent: *Aug. 29, 2023

(54) METHOD FOR SETTING MOTION VECTOR LIST AND APPARATUS USING SAME

(71) Applicant: LG Electronics Inc., Seoul (KR)

(72) Inventors: Seung Wook Park, Seoul (KR); Jae Hyun Lim, Seoul (KR); Jung Sun Kim, Seoul (KR); Joon Young Park, Seoul (KR); Young Hee Choi, Seoul (KR); Byeong Moon Jeon, Seoul (KR); Yong Joon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

This patent is subject to a terminal disclaimer.

(21) Appl. No.: 17/395,953

(22) Filed: Aug. 6, 2021

(65) Prior Publication Data

US 2021/0368201 A1 Nov. 25, 2021

Related U.S. Application Data

(63) Continuation of application No. 16/694,784, filed on Nov. 25, 2019, now Pat. No. 11,128,886, which is a continuation of application No. 14/129,124, filed as application No. PCT/KR2011/009000 on Nov. 23, 2011, now Pat. No. 10,491,918.

(Continued)

(51) Int. Cl.
*H04N 19/513* (2014.01)
*H04N 19/52* (2014.01)

(52) U.S. Cl.
CPC ......... *H04N 19/521* (2014.11); *H04N 19/52* (2014.11)

(58) Field of Classification Search
None
See application file for complete search history.

(56) References Cited

U.S. PATENT DOCUMENTS

| 5,162,907 A | 11/1992 | Keating |
| 6,185,340 B1 | 2/2001 | Comer |

(Continued)

FOREIGN PATENT DOCUMENTS

| CA | 2794379 | 1/2012 |
| CA | 2805663 | 7/2012 |

(Continued)

OTHER PUBLICATIONS

CA Office Action dated Aug. 26, 2015 for Canadian Application No. 2,840,381, 4 pages.

(Continued)

*Primary Examiner* — Stefan Gadomski
(74) *Attorney, Agent, or Firm* — Fish & Richardson P.C.

(57) ABSTRACT

A method for setting the motion vector list and the apparatus using the same may include determining the presence of a first motion vector or a second motion vector by a sequential determination process in a first spatial candidate prediction group; and setting the first motion vector or the second motion vector produced through the sequential determination process as the candidate prediction motion vector. Thus, the encoding/decoding time and the complexity can be reduced by restricting the scaling number in a process for scanning the candidate prediction motion vector.

15 Claims, 11 Drawing Sheets

Related U.S. Application Data

(60) Provisional application No. 61/502,829, filed on Jun. 29, 2011, provisional application No. 61/502,833, filed on Jun. 29, 2011, provisional application No. 61/501,772, filed on Jun. 28, 2011.

(56) References Cited

U.S. PATENT DOCUMENTS

| | | |
|---|---|---|
| 6,275,536 B1 | 8/2001 | Chen |
| 6,768,775 B1 | 7/2004 | Wen |
| 6,990,148 B2 | 1/2006 | Yang |
| 7,362,808 B2 | 4/2008 | Kang |
| 7,532,669 B2 | 5/2009 | Wen |
| 7,590,180 B2 | 9/2009 | Kang |
| 9,392,300 B2 | 7/2016 | Kim |
| 9,565,447 B2 * | 2/2017 | Lee .................. H04N 19/56 |
| 10,491,918 B2 | 11/2019 | Park et al. |
| 2003/0128755 A1 | 7/2003 | Wen |
| 2003/0161403 A1 | 8/2003 | Yang |
| 2004/0008784 A1 | 1/2004 | Kikuchi |
| 2004/0114688 A1 | 6/2004 | Kang |
| 2004/0136461 A1 | 7/2004 | Kondo et al. |
| 2005/0053297 A1 | 3/2005 | Mukerjee |
| 2006/0012719 A1 | 1/2006 | Karczewicz et al. |
| 2006/0133503 A1 | 6/2006 | Park |
| 2007/0110161 A1 | 5/2007 | Saigo |
| 2008/0043843 A1 | 2/2008 | Nakaishi |
| 2008/0063075 A1 | 3/2008 | Kondo |
| 2008/0069234 A1 | 3/2008 | Kadono |
| 2008/0205526 A1 | 8/2008 | Kang |
| 2009/0067502 A1 | 3/2009 | Jeon et al. |
| 2009/0074069 A1 | 3/2009 | Jeon |
| 2009/0074070 A1 | 3/2009 | Yin |
| 2009/0207914 A1 | 8/2009 | Choi |
| 2010/0183079 A1 | 7/2010 | Jeon |
| 2010/0220790 A1 | 9/2010 | Jeon |
| 2011/0080954 A1 * | 4/2011 | Bossen ............. H04N 19/573 375/E7.125 |
| 2011/0176613 A1 * | 7/2011 | Tsai ................. H04N 19/172 375/240.16 |
| 2011/0188579 A1 | 8/2011 | Lin et al. |
| 2011/0200112 A1 | 8/2011 | Won |
| 2012/0008688 A1 | 1/2012 | Tsai |
| 2012/0008690 A1 | 1/2012 | Lee |
| 2012/0128060 A1 | 5/2012 | Lin |
| 2012/0134415 A1 | 5/2012 | Lin |
| 2012/0163466 A1 | 6/2012 | Sugio |
| 2012/0177123 A1 | 7/2012 | Zhou |
| 2012/0269270 A1 | 10/2012 | Chen |
| 2012/0320968 A1 | 12/2012 | Zheng |
| 2013/0101040 A1 | 4/2013 | Francois et al. |
| 2013/0208787 A1 | 8/2013 | Zheng et al. |
| 2014/0092981 A1 | 4/2014 | Lin et al. |

FOREIGN PATENT DOCUMENTS

| | | |
|---|---|---|
| CA | 2840381 | 1/2013 |
| CN | 1441594 | 9/2003 |
| CN | 1487747 | 4/2004 |
| CN | 1497981 | 5/2004 |
| CN | 1777289 | 5/2006 |
| CN | 1960496 | 5/2007 |
| CN | 101073265 | 11/2007 |
| CN | 101123728 | 2/2008 |
| CN | 101222627 | 7/2008 |
| CN | 101540911 | 9/2009 |
| CN | 101600108 | 12/2009 |
| CN | 101605256 | 12/2009 |
| CN | 101647281 | 2/2010 |
| CN | 101820547 | 9/2010 |
| CN | 101884219 | 11/2010 |
| CN | 102835113 | 12/2012 |
| CN | 103918267 | 7/2014 |
| EP | 1339234 | 8/2003 |
| EP | 2216995 | 8/2010 |
| EP | 2740271 | 6/2014 |
| EP | 2557796 | 10/2014 |
| KR | 1019990066826 | 8/1999 |
| KR | 1020030070455 | 8/2003 |
| KR | 1020040050127 | 6/2004 |
| KR | 20090099591 A * | 9/2009 |
| KR | 2010050706 | 5/2010 |
| KR | 2010081984 | 7/2010 |
| WO | WO2009115901 | 9/2009 |
| WO | WO2012006889 | 1/2012 |

OTHER PUBLICATIONS

CA Office Action in Canadian Patent Application No. 3,019,973, dated Aug. 1, 2019, 5 pages.
CA Office Action issued in Canadian Application No. 2,840,381 dated Aug. 16, 2016, 2 pages.
Chinese Office Action in Chinese Appln. No. 201810087923.3, dated Jun. 2, 2021, 17 pages (with English translation).
CN Office Action in Chinese Appln. No. 201810088099.3, dated Jun. 15, 2021, 17 pages (with English translation).
CN Office Action in Chinese Appln. No. 201810089076.4, dated Jun. 15, 2021, 17 pages (with English translation).
CN Office Action in Chinese Appln. No. 201810089092.3, dated Jun. 16, 2021, 14 pages (with English translation).
Coban et al., "Motion Vector Predictor Candidate Clipping Removal", Joint Collaborative Team on Video Coding (JCT-VC) of ITS-T SG16 WP3 and ISO/IEC JTC1/SC29/WG11, 7th Meeting: Geneva, CH, Nov. 21-30, 2011, 9 pages.
European Search Report dated Nov. 21, 2014 for corresponding European Patent Application No. 11868701.1, 19 pages.
International Search Report dated May 1, 2012 for Application No. PCT/KR2011/009000, with English Translation, 4 pages.
McCann et al., "HM3: High Efficiency Video Coding (HEVC) Test Model 3 Encoder Description", Joint Collaborative Team on Video COding (JCT-VC) of ITS-T SG16 WP3 and ISO/IEC JTC1/SC29/WG11, 5th Meeting: Geneva, CH, Mar. 16-23, 2011.
Sugio et al., "Non-CE9/Non-CE13: Simplification on AMVP/Merge", Joint Collaborative Team on Video Coding (JCT-VC) of ITS-T SG16 WP3 and ISO/IEC JTC1/SC29/WG11, 7th Meeting: Geneva, CH, Nov. 21-30, 201, 11 pages.

* cited by examiner

METHOD FOR SETTING MOTION VECTOR LIST AND APPARATUS USING SAME

CROSS REFERENCE TO RELATED APPLICATIONS

This application is a continuation of U.S. application Ser. No. 16/694,784, filed on Nov. 25, 2019, which is a continuation on U.S. application Ser. No. 14/129,124, filed on Dec. 24, 2013, now U.S. Pat. No. 10,491,918, which is a U.S. National Phase Application under 35 U.S.C. § 371 of International Application PCT/KR2011/009000, filed on Nov. 23, 2011, which claims the benefit of U.S. Provisional Application No. 61/501,772, filed on Jun. 28, 2011, U.S. Provisional Application No. 61/502,833, filed on Jun. 29, 2011, and U.S. Provisional Application No. 61/502,829, filed on Jun. 29, 2011. The disclosures of the prior applications are incorporated by reference in their entirety.

BACKGROUND OF THE INVENTION

Field of the Invention

The present invention relates to a method of setting a motion vector list and an apparatus using the same, and more particularly, to a decoding method and a decoding apparatus.

Related Art

Recently, demands for high-resolution and high-quality images such as high definition (HD) and ultrahigh definition (UHD) images have increased in various fields of applications. As image data has higher resolution and higher quality, the amount of data on the images increases as compared with conventional image data. Accordingly, when image data is transferred using media such as existing wired and wireless broadband lines or is stored using conventional storage media, transfer and storage costs of the image data rise. In order to solve these problems occurring with an increase in resolution and quality of image data, high-efficiency image compression techniques may be utilized.

The image compression techniques include various methods such as inter prediction of predicting pixel values within a current picture from previous or subsequent pictures to the current picture, intra prediction of predicting pixel values within a current picture using pixel information within the current picture, and entropy encoding of assigning a short code to a value with a high appearance frequency and assigning a long code to a value with a low appearance frequency. Image data may be effectively compressed and transferred or stored using such image compressing techniques.

SUMMARY OF THE INVENTION

An aspect of the present invention is to provide a method of setting a candidate prediction motion vector list to enhance image encoding efficiency.

Another aspect of the present invention is to provide an apparatus for performing a method of setting a candidate prediction motion vector list to enhance image encoding efficiency.

An embodiment of the present invention provides a video decoding method including determining whether a first motion vector or a second motion vector is present in a first spatial candidate prediction group by sequential determination and setting the first motion vector or the second motion vector derived by the sequential determination as a motion vector predictor candidate. The first spatial candidate prediction group may include a first left block and a second left block. The first motion vector may include the same reference frame and the same reference picture list as those of a current prediction unit, and the second motion vector may include the same reference frame as that of the current prediction unit and a different reference picture list from that of the current prediction unit. The video decoding method may further include determining whether a third motion vector or a fourth motion vector is present in the first spatial candidate prediction group by sequential determination and setting as a motion vector predictor candidate by scaling the third motion vector or the fourth motion vector derived by the sequential determination and changing information on whether to conduct scaling. The third motion vector may include a different reference frame and the same reference picture list, and the fourth motion vector may include a different reference frame and a different reference picture list. The video decoding method may further include determining whether a first motion vector or a second motion vector is present in a second spatial candidate prediction group by sequential determination and setting the first motion vector or the second motion vector derived by the sequential determination as a motion vector predictor candidate. The second spatial candidate prediction group may include a first upper block, a second upper block and a third upper block. The video decoding method may further include determining whether scaling is carried out on the c motion vector predictor candidate derived from the first spatial candidate prediction group based on the information on whether to conduct scaling. The video decoding method may further include determining whether the third motion vector or the fourth motion vector is present in the second spatial candidate prediction group by sequential determination, and setting as a motion vector predictor candidate by scaling the third motion vector or the fourth motion vector derived by the sequential determination and changing information on whether to conduct scaling. The video decoding method may further include including a motion vector of a temporal candidate prediction unit in a motion vector predictor candidate list as a motion vector predictor candidate when the motion vector is present. The video decoding method may further include determining whether the same motion vector predictor candidates are present among the motion vector predictor candidates derived from at least one of the first spatial candidate prediction group, the second spatial candidate prediction group and the temporal candidate prediction unit and removing the same motion vector predictor candidates other than a motion vector predictor candidate having top priority when the same motion vector predictor candidates are present. The video decoding method may further include adding an additional motion vector predictor candidate to the motion vector predictor candidate list when the motion vector predictor candidate list comprises a preset number or fewer of motion vector predictor candidates and does not comprise the same vector as the additional motion vector predictor candidate to be added to the motion vector predictor candidate list.

As described above, a method of setting a motion vector list and an apparatus using the same according to exemplary embodiments of the present invention limit a number of scaling times in scanning a candidate predicted motion vector, thereby reducing time involved in encoding/decoding and decreasing complexity.

DESCRIPTION OF EXEMPLARY EMBODIMENTS

Figure 1:
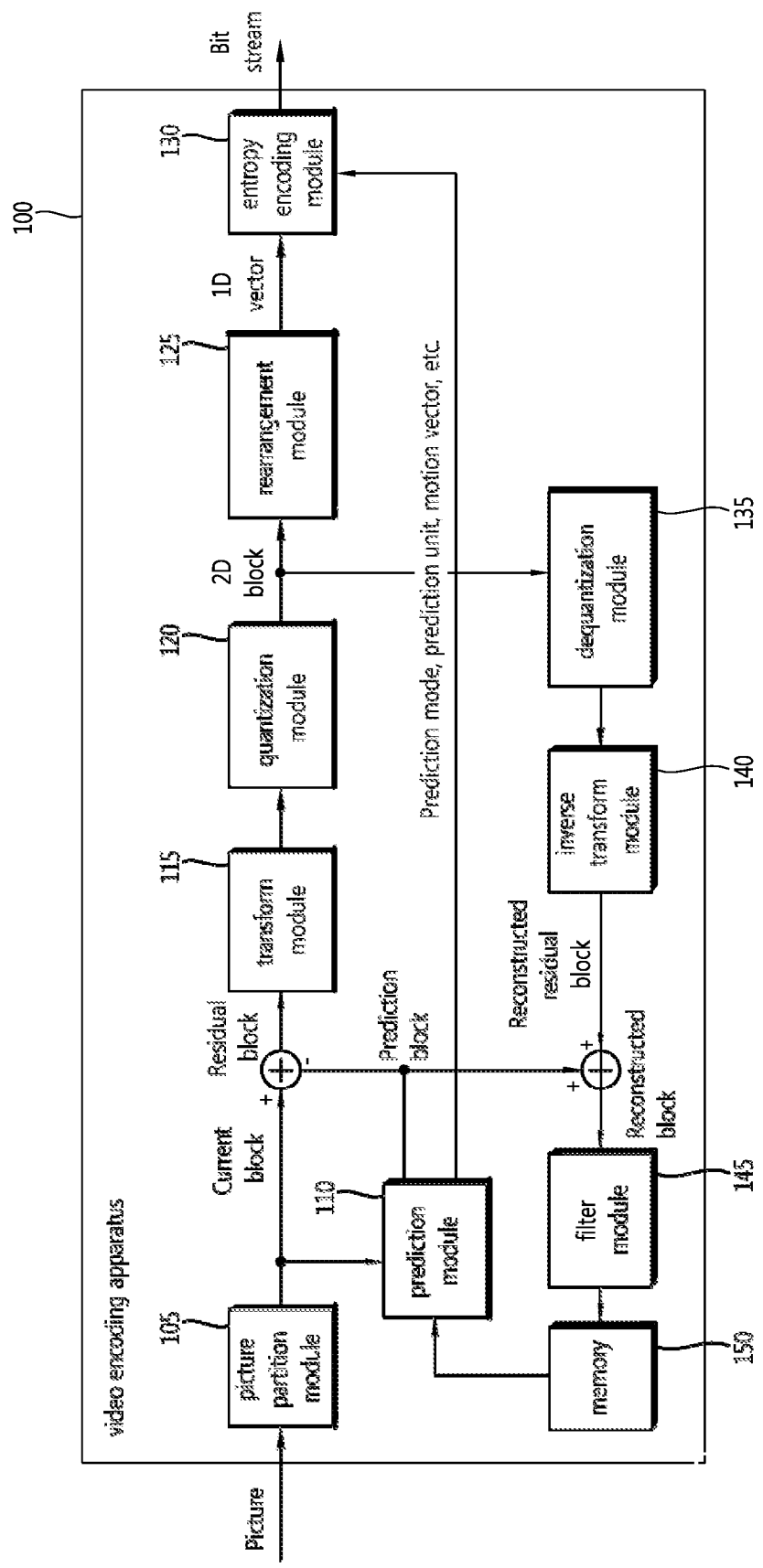
FIG. 1 is a block diagram illustrating a video encoding apparatus according to an exemplary embodiment of the present invention.

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a video encoding apparatus according to an exemplary embodiment of the present invention.

Referring to FIG. 1, the video encoding apparatus 100 includes a picture partition module 105, a prediction module 110, a transform module 115, a quantization module 120, a rearrangement module 125, an entropy encoding module 130, a dequantization module 135, an inverse transform module 140, a filter 145 and a memory 150.

Although elements illustrated in FIG. 1 are independently shown so as to represent different distinctive functions in the video encoding apparatus, such a configuration does not indicate that each element is constructed by a separate hardware constituent or software constituent. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture partition module 105 may partition an input picture into at least one process unit. Here, the process unit may be a prediction unit (PU), a transform unit (TU) or a coding unit (CU). The picture partition module 105 may partition one picture into a plurality of combinations of coding units, prediction units and transform units and select one combination of coding units, prediction units and transform units on the basis of a predetermined criterion (for example, a cost function), thereby encoding the picture.

For example, one picture may be partitioned into a plurality of coding units. A recursive tree structure such as a quad tree structure may be used to partition a picture into coding units. A coding unit which may be a picture or a coding unit of a maximum size as root may be partitioned into sub-coding units with as many child nodes as the partitioned coding units. A coding unit which is not partitioned any more in accordance with a predetermined limitation is a leaf node. That is, assuming that a coding unit may be partitioned into quadrants only, a single coding unit may be partitioned into at most four different coding units.

In the embodiments of the invention, a coding unit may be used to refer to not only a unit of encoding but also a unit of decoding.

A prediction unit may be partitioned in at least one square or rectangular shape with the same size in a coding unit, or may be partitioned such that one of partitioned prediction units in a coding unit has a different from another prediction unit.

When a coding unit, which is used to generate a prediction unit to be subjected to intra prediction, is not a minimum coding unit, the coding unit may be subjected to intra prediction without being partitioned into plural prediction units (N×N).

The prediction module 110 may include an inter prediction module to perform inter prediction and an intra prediction module to perform intra prediction. The prediction module 110 may determine which of inter prediction or intra prediction should be performed on a prediction unit, and may determine specific information (for example, intra prediction mode, motion vector, and reference picture) of the determined prediction method. Here, a process unit on which prediction is performed may be different from a process unit for which a prediction method and specific information are determined. For example, a prediction method and a prediction mode may be determined for each prediction unit, while prediction may be performed for each transform unit. A residual value (residual block) between a generated predicted block and an original block may be input to the transform module 115. Further, prediction mode information, motion vector information and the like used for prediction may be encoded along with the residual value by the entropy encoding module 130 and be transmitted to the decoding apparatus. When a specific encoding mode is used, the original block may be encoded and transmitted to the decoding apparatus without generating a prediction block through the prediction module 110.

The inter prediction module may predict a prediction unit on the basis of information on at least one picture among a previous picture and a subsequent picture of a current picture. The inter prediction module may include a reference picture interpolation module, a motion prediction module, and a motion compensation module.

The reference picture interpolation module may be supplied with reference picture information from the memory 150 and generate pixel information less than an integer pixel from a reference picture. In the case of luma pixels, a DCT-based 8-tap interpolation filter having a varying filter coefficient may be used to generate pixel information less than an integer pixel in a unit of ¼ pixel. In the case of chroma pixels, a DCT-based 4-tap interpolation filter having a varying filter coefficient may be used to generate pixel information less than an integer pixel in a unit of ⅛ pixel.

The motion prediction module may perform motion prediction on the basis of the reference picture interpolated by the reference picture interpolation module. Various methods, such as a full search-based block matching algorithm (FBMA), a three-step search (TSS) algorithm and a new three-step search (NTS) algorithm, may be used to calculate a motion vector. A motion vector has a motion vector value in a unit of ½ or ¼ pixel on the basis of an interpolated pixel. The motion prediction module may predict a current prediction unit using different motion prediction methods. Various methods, such as skipping, merging, and advanced motion vector prediction (AMVP), may be used as the motion prediction method.

A method of constructing a motion vector predictor candidate list in performing inter prediction using AMVP according to an embodiment of the invention will be described below.

The intra prediction module may generate a prediction unit on the basis of reference pixel information around a current block which is pixel information in a current picture. When a block around a current prediction unit is a block having been subjected to inter prediction and a reference pixel is a pixel having been subjected to inter prediction, reference pixels included in the block having been subjected to inter prediction may be replaced with reference pixel information on a block having been subjected to intra prediction. That is, when a reference pixel is not available, information on the unavailable reference pixel may be replaced with at least one reference pixel of the available reference pixels.

A prediction mode of intra prediction includes a directive prediction mode in which reference pixel information is used according to a prediction direction and a non-directive prediction mode in which directivity information is not used in performing prediction. A mode for predicting luma information and a mode for predicting chroma information may be different from each other. Intra prediction mode information used to obtain luma information or predicted luma signal information may be used to predict chroma information.

When a prediction unit and a transform unit have the same size in performing intra prediction, intra prediction on the prediction unit may be performed based on left pixels, an upper-left pixel and upper pixels of the prediction unit. On the other hand, when a prediction unit and a transform unit have different sizes in performing intra prediction, intra prediction may be performed using reference pixels based on the transform unit. Intra prediction using N×N partitioning may be used only for a minimum coding unit.

In the intra prediction method, an adaptive intra smoothing (AIS) filter may be applied to reference pixels according to the prediction mode to generate a predicted block. Different types of AIS filters may be applied to the reference pixels. In the intra prediction method, the intra prediction mode of a current prediction unit may be predicted from an intra prediction mode of a prediction unit located around the current prediction unit. In predicting the prediction mode of the current prediction unit using mode information predicted from a neighboring prediction unit, when the current prediction unit and the neighboring prediction unit have the same intra prediction mode, information indicating that the current prediction unit and the neighboring prediction unit have the same prediction mode may be transmitted using predetermined flag information. If the current prediction unit and the neighboring prediction unit have different prediction modes, information on the prediction mode of the current block may be encoded by entropy encoding.

A residual block including residual information which is a difference between the predicted prediction unit and the original block of the prediction unit may be generated based on the prediction unit generated by the prediction module 110. The generated residual block may be input to the transform module 115. The transform module 115 may transform the residual block including the residual information of the prediction unit generated by the prediction module 110 and the original block using a transform method such as Discrete Cosine Transform (DCT) or Discrete Sine Transform (DST). A transform method to be used to transform the residual block may be determined among DCT and DST on the basis of the intra prediction mode information of the prediction unit used to generate the residual block.

The quantization module 120 may quantize values transformed into a frequency domain by the transform module 115. A quantization coefficient may change depending on a block or importance of a picture. Values output from the quantization module 120 may be supplied to the dequantization module 135 and the rearrangement module 125.

The rearrangement module 125 may rearrange coefficients with respect to quantized residual values.

The rearrangement module 125 may change coefficients in the form of a two-dimensional (2D) block into the form of a one-dimensional (1D) vector through coefficient scanning. For example, the rearrangement module 125 may change coefficients in the form of a 2D block into the form of a 1D vector by scanning from DC coefficients to coefficients of a high frequency domain using zigzag scanning. Vertical scanning of scanning coefficients of a 2D block form in a column direction and horizontal scanning of scanning coefficients of a 2D block form in a row direction may be used depending on a size of a transform unit and an intra prediction mode, instead of zigzag scanning. That is, a scanning method for use may be selected based on the size of the transform unit and the intra prediction mode among zigzag scanning, vertical scanning, and horizontal scanning.

The entropy encoding module 130 may perform entropy encoding on the basis of the values obtained by the rearrangement module 125. Various encoding methods, such as exponential Golomb, context-adaptive variable length coding (CAVLC), and context-adaptive binary arithmetic coding (CABAC), may be used for entropy encoding.

The entropy encoding module 130 may encode a variety of information, such as residual coefficient information and block type information on a coding unit, prediction mode information, partitioning unit information, prediction unit information, transfer unit information, motion vector information, reference frame information, block interpolation information and filtering information from the rearrangement module 125 and the prediction module 110.

The entropy encoding module 130 may entropy-encode coefficients of a coding unit input from the rearrangement module 125.

The entropy encoding module 130 may store a table for conducting entropy encoding, such as a variable-length code (VLC) table, and conduct entropy encoding using the VLC table. In entropy encoding, a method of using a counter for some codewords included in the table or direct swapping method may be used to change allocation of a codeword to a code number of information. For instance, in a plurality of higher code numbers allocated codeword of short bits in a table mapping a code number and a codeword, mapping order of the table mapping the codeword and the code number may be adaptively changed so as to allocate a short-length codeword to a code number having a highest number of occurrence times of added code numbers using a counter. When a number of counting times by the counter is a preset threshold, the number of counting times recorded in the counter may be divided in half, followed by counting again.

A code number in the table which is not counted may be subjected to entropy encoding by reducing a bit number allocated to the code number via a method of switching a position with a right higher code number when information corresponding to the code number occurs using the direct swapping method.

The dequantization module 135 and the inverse transform module 140 inversely quantize the values quantized by the quantization module 120 and inversely transform the values transformed by the transform module 115. The residual values generated by the dequantization module 135 and the inverse transform module 140 may be added to the prediction unit, which is predicted by the motion estimation module, the motion compensation module, and the intra prediction module of the prediction module 110, thereby generating a reconstructed block.

The filter module 145 may include at least one of a deblocking filter, an offset correction module, and an adaptive loop filter (ALF).

The deblocking filter 145 may remove block distortion generated on boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset correction module may correct an offset of the deblocked picture from the original picture by a pixel. A method of partitioning pixels of a picture into a predetermined number of regions, determining a region to be subjected to offset correction, and applying offset correction to the determined region or a method of applying offset correction in consideration of edge information on each pixel may be used to perform offset correction on a specific picture.

The ALF may perform filtering based on a comparison result of the filtered reconstructed picture and the original picture. Pixels included in a picture may be partitioned into predetermined groups, a filter to be applied to each group may be determined, and differential filtering may be performed for each group. Information on whether to apply the ALF may be transferred by each coding unit (CU) and a size and coefficient of an ALF to be applied to each block may vary. The ALF may have various types and a number of coefficients included in a corresponding filter may vary. Filtering-related information on the ALF, such as filter coefficient information, ALF ON/OFF information, and filter type information, may be included and transferred in a predetermined parameter set of a bitstream.

The memory 150 may store a reconstructed block or picture output from the filter module 145, and the stored reconstructed block or picture may be supplied to the prediction module 110 when performing inter prediction.

Figure 2:
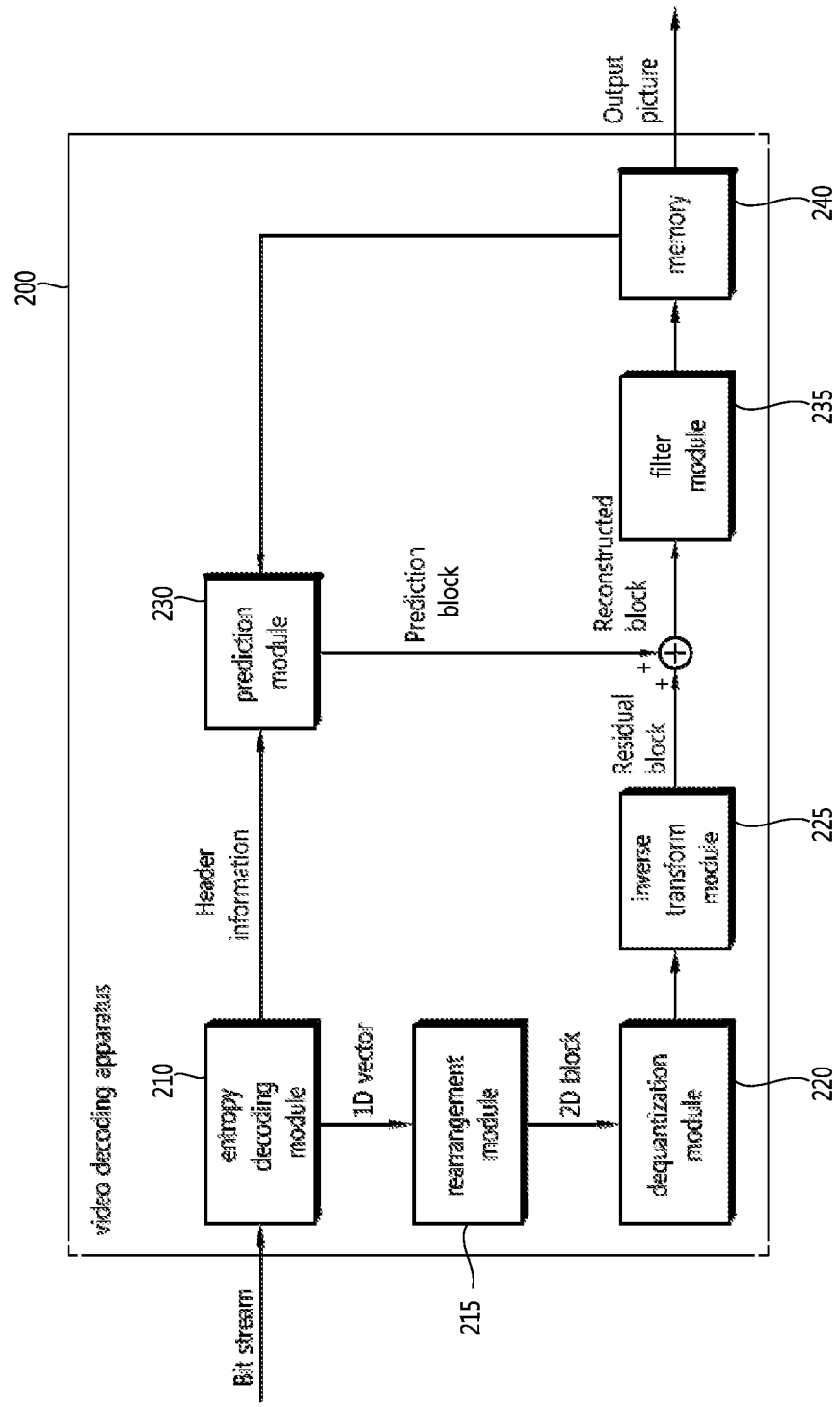
FIG. 2 is a block diagram illustrating a video decoding apparatus according to an exemplary embodiment of the present invention.

FIG. 2 is a block diagram illustrating a video decoding apparatus according an exemplary embodiment of the present invention.

Referring to FIG. 2, the video decoding apparatus 200 may include an entropy decoding module 210, a rearrangement module 215, a dequantization module 220, an inverse transform module 225, a prediction module 230, a filter module 235, and a memory 240.

When a video bit stream is input from the video encoding apparatus, the input bit stream may be decoded according to an inverse process of the video encoding process by the video encoding apparatus.

The entropy decoding module 210 may perform entropy decoding according to an inverse process of the entropy encoding process by the entropy encoding module of the video encoding apparatus. For example, the same VLC table as used for entropy encoding in the video encoding apparatus may be used to conduct entropy decoding. Information for generating a prediction block among information decoded in the entropy decoding module 210 may be provided to the prediction module 230, and residual values obtained via entropy decoding by the entropy decoding module may be input to the rearrangement module 215.

Like the entropy encoding module, the entropy decoding module 210 may also change a codeword allocation table using a counter or direct swapping method and conduct entropy decoding based on the changed codeword allocation table.

The entropy decoding module 210 may decode information associated with intra prediction and inter prediction performed by the encoding apparatus. As described above, when the video encoding apparatus has predetermined restrictions in performing intra prediction and inter prediction, the entropy decoding module may perform entropy decoding based on the restrictions to obtain information on intra prediction and inter prediction of a current block.

The entropy decoding module 210 may decode information on an intra prediction mode for a current prediction unit using a predetermined binary code based on a method of decoding an intra encoding mode according to an exemplary embodiment to be described with reference to FIGS. 3 to 8.

The rearrangement module 215 may perform rearrangement on the bitstream entropy-decoded by the entropy decoding module 210 on the basis of the rearrangement method of the encoding module. The rearrangement module 215 may reconstruct and rearrange coefficients expressed in a 1D vector form into coefficients in a 2D block. The rearrangement module 215 may be supplied with information associated with coefficient scanning performed by the encoding module and may perform rearrangement using a method of inversely scanning the coefficients on the basis of scanning order in which scanning is performed by the encoding module.

The dequantization module 220 may perform dequantization on the basis of a quantization parameter supplied from the encoding apparatus and the rearranged coefficients of the block.

The inverse transform module 225 may perform inverse DCT and inverse DST on a result of quantization performed by the video encoding apparatus, having been subjected to DCT and DST performed by the transform module. Inverse transform may be performed on the basis of a transfer unit determined by the video encoding apparatus. The transform module of the video encoding apparatus may selectively perform DCT and DST depending on a plurality of information elements, such as a prediction method, a size of the current block and a prediction direction, and the inverse transform module 225 of the video decoding apparatus may perform inverse transform on the basis of information on the transform performed by the transform module of the video encoding apparatus.

Transform may be performed by a coding unit instead of by a transform unit.

The prediction module 230 may generate a prediction block on the basis of prediction block generation information supplied from the entropy decoding module 210 and information on a previously-decoded block or picture supplied from the memory 240.

Similarly to the operation of the video encoding apparatus as described above, when a prediction unit and a transform unit have the same size in performing intra prediction, intra prediction on the prediction unit is performed based on left pixels, an upper-left pixel and upper pixels of the prediction unit. On the other hand, when a prediction unit and a transform unit have different sizes in performing intra prediction, intra prediction may be performed using reference pixels based on the transform unit. Intra prediction using N×N partitioning may be used only for a minimum coding unit.

The prediction module 230 includes a prediction unit determination module, an inter prediction module and an intra prediction module. The prediction unit determination module may receive a variety of information, such as prediction unit information input from the entropy decoding module, prediction mode information on an intra prediction method and motion prediction-related information on an inter prediction method, may determine a prediction unit in a current coding unit, and may determine which of the inter prediction and the intra prediction is performed on the prediction unit. The inter prediction module may perform inter prediction on a current prediction unit on the basis of information included in at least one picture among a previous picture and a subsequent picture of a current picture including the current prediction unit using information necessary for inter prediction of the current prediction unit supplied from the video encoding apparatus.

In order to perform inter prediction, it may be determined on the basis of a coding unit whether a motion prediction method for a prediction unit included in the coding unit is a skip mode, a merging mode or an AMVP mode.

Hereinafter, a method of constructing a motion vector predictor candidate list in performing intra prediction using AMVP according to an exemplary embodiment of the present invention will be described.

The intra prediction module may generate a prediction block on the basis of pixel information in a current picture. When a prediction unit is a prediction unit obtained by intra prediction, intra prediction may be performed based on intra prediction mode information on the prediction unit supplied from the video encoding apparatus. The intra prediction module may include an AIS filter, a reference pixel interpolation module, and a DC filter. The AIS filter performs filtering on reference pixels of a current block, and whether to apply the filter may be determined depending on a prediction mode of the current prediction unit. AIS filtering may be performed on the reference pixels of the current block using the prediction mode of the prediction unit and information on the AIS filter supplied from the video encoding apparatus. When the prediction mode of the current block is a mode not involving AIS filtering, the AIS filter may not be applied.

When the prediction mode of the prediction unit is a prediction mode of performing intra prediction on the basis of pixel values obtained by interpolating the reference pixels, the reference pixel interpolation module may generate reference pixels in a pixel unit of less than an integer by interpolating the reference pixels. When the prediction mode of the current prediction unit is a prediction mode of generating a prediction block without interpolating the reference pixels, the reference pixels may not be interpolated. The DC filter may generate a prediction block through filtering when the prediction mode of the current block is the DC mode.

The reconstructed block or picture may be supplied to the filter module 235. The filter module 235 includes a deblocking filter, an offset correction module, and an ALF.

Information on whether the deblocking filter is applied to a corresponding block or picture and information on which of a strong filter and a weak filter is applied when the deblocking filter is used may be supplied from the video encoding apparatus. The deblocking filter of the video decoding apparatus may be supplied with information on the deblocking filter from the video encoding apparatus and may perform deblocking filtering on a corresponding block in the video decoding apparatus. Similarly to the video encoding apparatus, vertical deblocking filtering and horizontal deblocking filtering are performed first, in which at least one of vertical deblocking filtering and horizontal deblocking filtering may be performed on an overlapping region. Either of vertical deblocking filtering and horizontal deblocking filtering which is not previously performed may be performed on the region in which vertical deblocking filtering and horizontal deblocking filtering overlap. This deblocking filtering process may enable parallel processing of deblocking filtering.

The offset correction module may perform offset correction on the reconstructed picture on the basis of an offset correction type and offset value information applied to the picture in encoding.

The ALF may perform filtering on the basis of a comparison result between the reconstructed picture obtained via filtering and the original picture. The ALF may be applied to a coding unit on the basis of information on whether the ALF is applied and ALF coefficient information supplied from the encoding apparatus. The ALF information may be included and supplied in a specific parameter set.

The memory 240 may store the reconstructed picture or block for use as a reference picture or a reference block and may supply the reconstructed picture to an output module.

As described above, in the embodiments of the invention, the term "coding unit" is used as an encoding unit and may be also used as a unit of decoding.

A video encoding method and a video decoding method, which will be mentioned with reference to the following embodiments of the invention, may be performed by the components of the video encoding apparatus and the video decoding apparatus described above with reference to FIGS. 1 and 2. The components may include not only hardware constituents but software process units which may be performed through algorithms.

Figure 3:
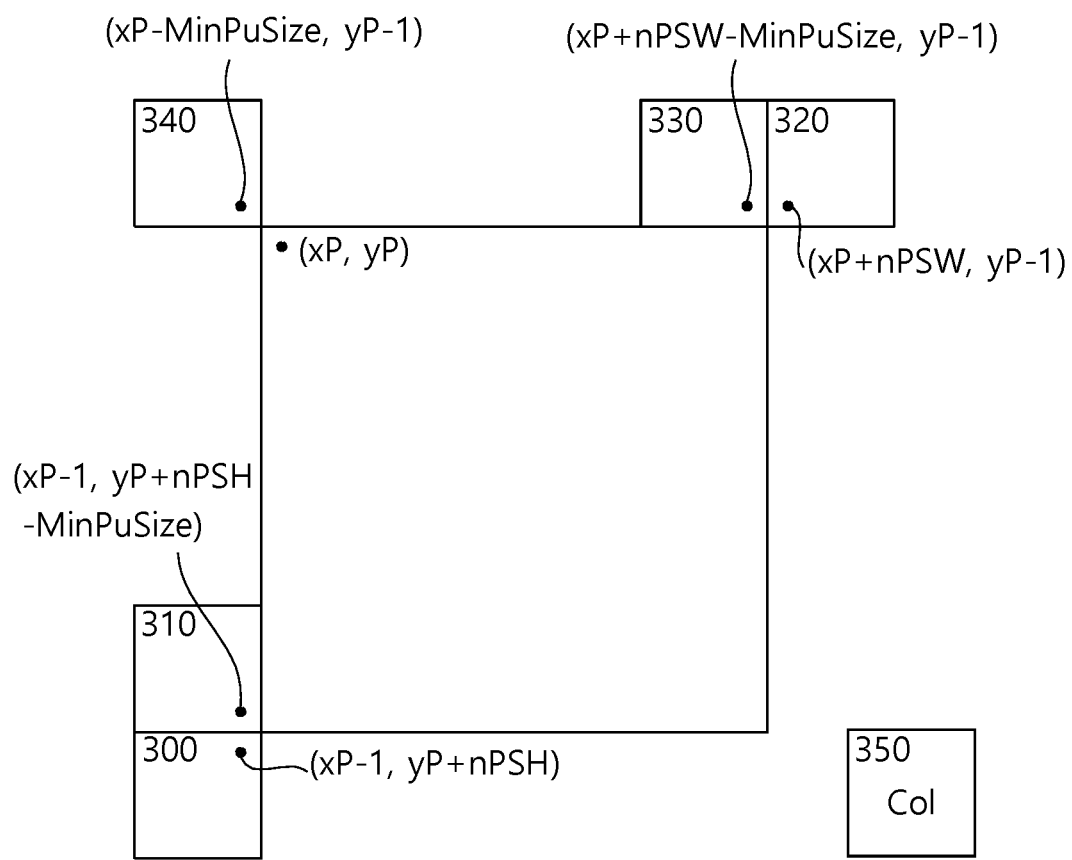
FIG. 3 illustrates a spatial candidate prediction unit and a temporal candidate prediction unit for generating a motion vector predictor according to an exemplary embodiment of the present invention.

FIG. 3 illustrates a spatial candidate prediction unit and a temporal candidate prediction unit for generating a motion vector predictor according to an exemplary embodiment of the present invention.

A location of a pixel disposed on an upper left of a current prediction unit is defined as (xP, yP), a width of the current prediction unit is defined as a variable nPSW, and a height thereof is defined as a variable nPSH. A variable MinPuSize to represent a spatial candidate prediction unit is a smallest size of a prediction unit available for the prediction unit.

In the following embodiment, regarding spatial prediction units neighboring the current prediction unit, a block including a pixel located at (xP−1, yP+nPSH) is defined as a first left block 300, and a block including a pixel located at (xP−1, yP+nPSH−MinPuSize) as a second left block 310. Also, a block including a pixel located at (xP+nPSW, yP−1) is defined as a first upper block 320, a block including a pixel located at (xP+nPSW−MinPuSize, yP−1) as a second upper block 330, and a block including a pixel located at (xP−MinPuSize, yP−1) as a third upper block 340.

The spatial candidate prediction unit may include the first left block 300, the second left block 310, the first upper block 320, the second upper block 330 and the third upper block 340. A group including the first left block 300 and the second left block 310 is defined as a first spatial candidate prediction group, and a group including the first upper block 320, the second upper block 330 and the third upper block 340 is defined as a second spatial candidate prediction group. A term including a prediction unit included in the first spatial candidate prediction group and a prediction unit included in the second spatial candidate prediction group may be represented as a spatial candidate prediction unit.

A temporal candidate prediction unit 350 may be a prediction unit including a pixel located at (xP+nPSW, yP+nPSH) of a colocated picture of the current prediction unit based on the pixel location (xP, yP) in a picture including the current prediction unit, or be a prediction unit including a pixel located at (xP+nPSW/2−1, yP+nPSH/2−1) when the prediction unit including the pixel located at (xP+nPSW, yP+nPSH) is unavailable.

Although FIG. 3 shows random locations and arbitrary numbers of spatial candidate prediction units and temporal candidate prediction units, locations and numbers of spatial candidate prediction units and temporal candidate prediction unit may vary within the scope of the present invention and locations of prediction units and a candidate prediction group preferentially scanned in constructing a motion vector predictor candidate list may also change. That is, locations, number, scanning order and a candidate prediction group of prediction units used in constructing the motion vector predictor cadidate list according to the following embodiments may change without departing from the essence of the present invention.

Figure 4:
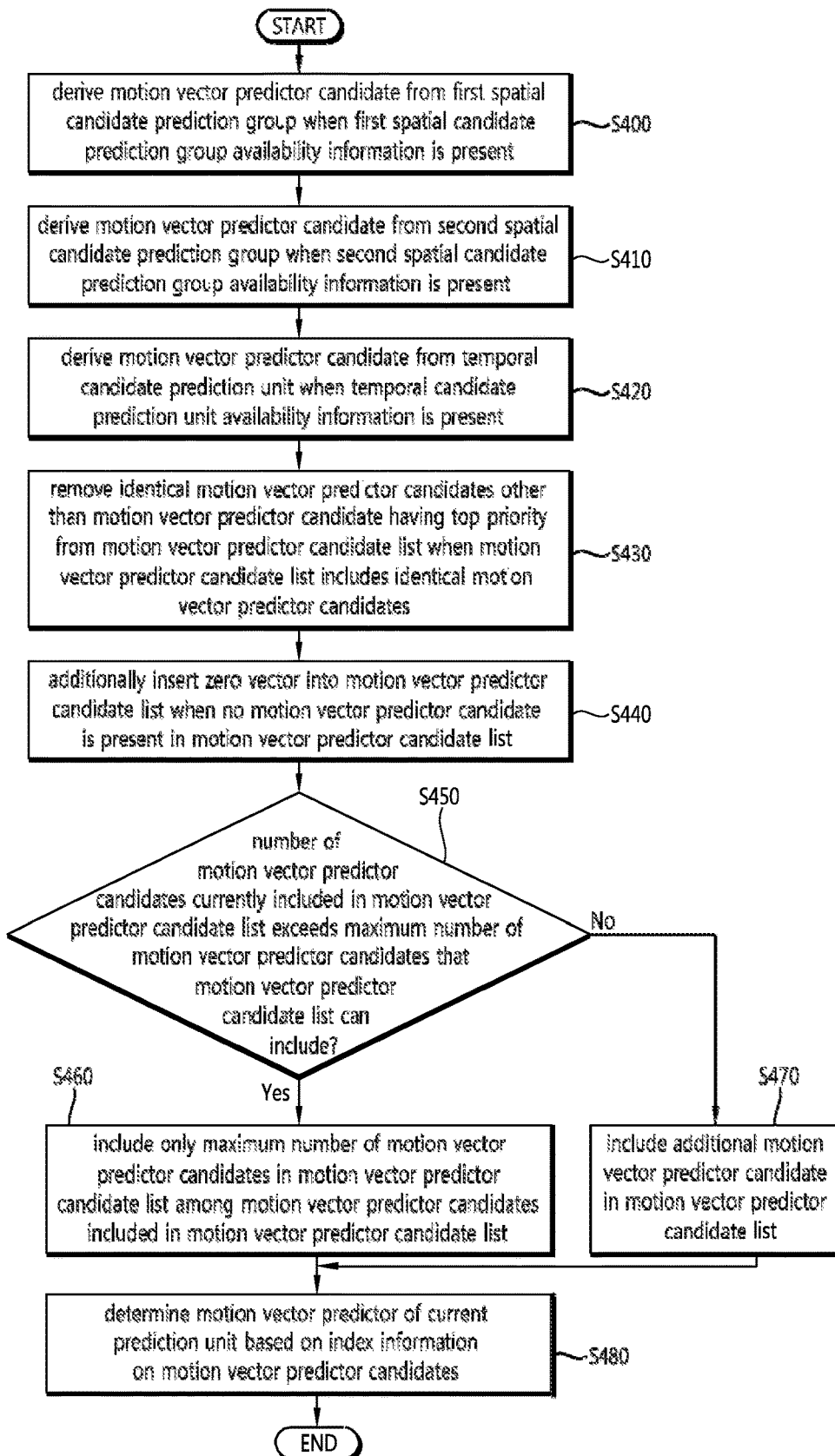
FIG. 4 is a flowchart illustrating a method of deriving a motion vector predictor according to an exemplary embodiment of the present invention.

FIG. 4 is a flowchart illustrating a method of deriving a motion vector predictor according to an exemplary embodiment of the present invention.

Referring to FIG. 4, when first spatial candidate prediction group availability information is present, a motion vector predictor candidate is derived from a first spatial candidate prediction group (S400).

As described above, the first spatial candidate prediction group may include the first left block and the second left block. The first spatial candidate prediction group availability information may be used to derive the motion vector predictor from the first spatial candidate prediction group. The first spatial candidate prediction group availability information may represent information on whether at least one motion vector among motion vectors of blocks included in the first spatial candidate prediction group is included in a motion vector predictor candidate list of a current prediction unit as an available motion vector predictor candidate based on predetermined bit information. A method of setting the first spatial candidate prediction group availability information and a method of deriving the motion vector predictor candidate will be described in the following exemplary embodiments.

When second spatial candidate prediction group availability information is present, a motion vector predictor candidate is derived from a second spatial candidate prediction group (S410).

As described above, the second spatial candidate prediction group may include the first upper block, the second upper block and the third upper block. The second spatial candidate prediction group availability information may be used to derive the motion vector predictor from the second spatial candidate prediction group. Similar to the first spatial candidate prediction group availability information, the second spatial candidate prediction group availability information may represent information on whether at least one motion vector among motion vectors of blocks included in the second spatial candidate prediction group is included in the motion vector predictor candidate list of the current prediction unit as a motion vector predictor candidate based on predetermined bit information. A method of setting the second spatial candidate prediction group availability information and a method of deriving the motion vector predictor candidate will be described in the following exemplary embodiment.

When temporal candidate prediction unit availability information is present, a motion vector predictor candidate is derived from a temporal candidate prediction unit (S420).

The temporal candidate prediction unit availability information may represent information on whether a motion vector of the temporal candidate prediction unit is included in the motion vector predictor candidate list of the current prediction unit as a motion vector predictor candidate based on predetermined bit information. A method of setting the temporal candidate prediction unit availability information and a method of deriving the motion vector predictor candidate will be described in the following exemplary embodiment.

The motion vector predictor candidate list may include the motion vectors derived in S400 to S420, that is, a motion vector predictor candidate derived from at least one of the first spatial candidate prediction group, the second spatial candidate prediction group and the temporal candidate prediction unit.

When the motion vector predictor candidate list includes identical motion vector predictor candidates, identical motion vector predictor candidates other than a motion vector predictor candidate having top priority are removed from the motion vector predictor candidate list (S430).

Only different motion vector predictor candidates among the motion vector predictor candidates derived in operations S400 to S420 of deriving the motion vector predictor candidates may be included in the motion vector predictor candidate list through an operation of determining sameness of motion vector predictor candidates in S430.

When no motion vector predictor candidate is present in the motion vector predictor candidate list, a zero vector is additionally inserted into the motion vector predictor candidate list (S440).

When no motion vector predictor candidate is derived in operations S400 to S420 of deriving the motion vector predictor candidate, no motion vector predictor candidate may be present in the motion vector predictor candidate list. In this case, the zero vector may be included in the motion vector predictor candidate list. The operation of including the zero vector in the motion vector predictor candidate list may be carried out in an integrated manner in operation S470 of inserting an additional motion vector predictor candidate, in which case this operation may not be carried out.

It is determined whether the number of motion vector predictor candidates included in the current motion vector predictor candidate list is greater than or equal to a maximum number of motion vector predictor candidates that the motion vector predictor candidate list can include (S450).

The number of motion vector predictor candidates that the motion vector predictor candidate list can include may be limited to a predetermined value. For example, when the maximum number of motion vector predictor candidates is limited to two, if three motion vector predictor candidates, exceeding the maximum number of motion vector predictors, are derived through S400 to S440, only two motion vector predictor candidates having higher priority may be included in the motion vector predictor candidate list and the other one motion vector predictor candidate may be excluded from the motion vector predictor candidate list.

When the number of motion vector predictor candidates included in the current motion vector predictor candidate list is greater than or equal to the maximum number that the motion vector predictor candidate list can include, only motion vector predictor candidates as many as a maximum number of motion vector predictor candidates among the motion vector predictor candidates included in the motion vector predictor candidate list are included in the motion vector predictor candidate list (S460).

A maximum number of motion vector predictor candidates may be included in order of higher priority in the motion vector predictor candidate list, and the remaining motion vector predictor candidates may be excluded from the motion vector predictor candidate list.

When the number of motion vector predictor candidates included in the current motion vector predictor candidate list is smaller than the maximum number of motion vector predictor candidates, an additional motion vector predictor candidate is included in the motion vector predictor candidate list (S470).

When the number of motion vector predictor candidates is smaller than the maximum number of motion vector predictor candidates that the motion vector predictor candidate list can include, an additional motion vector predictor candidate may be included in the motion vector predictor candidate list to construct the motion vector predictor candidate list. For example, when the motion vector predictor candidates included in the current motion vector predictor candidate list are not a zero vector, a zero vector may be included in the motion vector predictor candidate list as an additional motion vector predictor candidate. The additional motion vector predictor candidate may be a combination of vectors already present in the motion vector predictor candidate list or a scaled value, instead of the zero vector.

A motion vector predictor or the current prediction unit is determined based on index information on the motion vector predictor candidates (S480).

The index information on the motion vector predictor candidates may represent which motion vector predictor candidate is used as the motion vector predictor of the current prediction unit among the motion vector predictor candidates included in the motion vector predictor candidate list derived through S400 to S470. Information on the motion vector of the current prediction unit may be derived by adding the motion vector predictor of the current prediction unit derived based on the index information on the motion vector predictor candidates and differential motion vector information as a difference between a value of an original motion vector of the current prediction unit and a value of the motion vector predictor.

Figure 5:
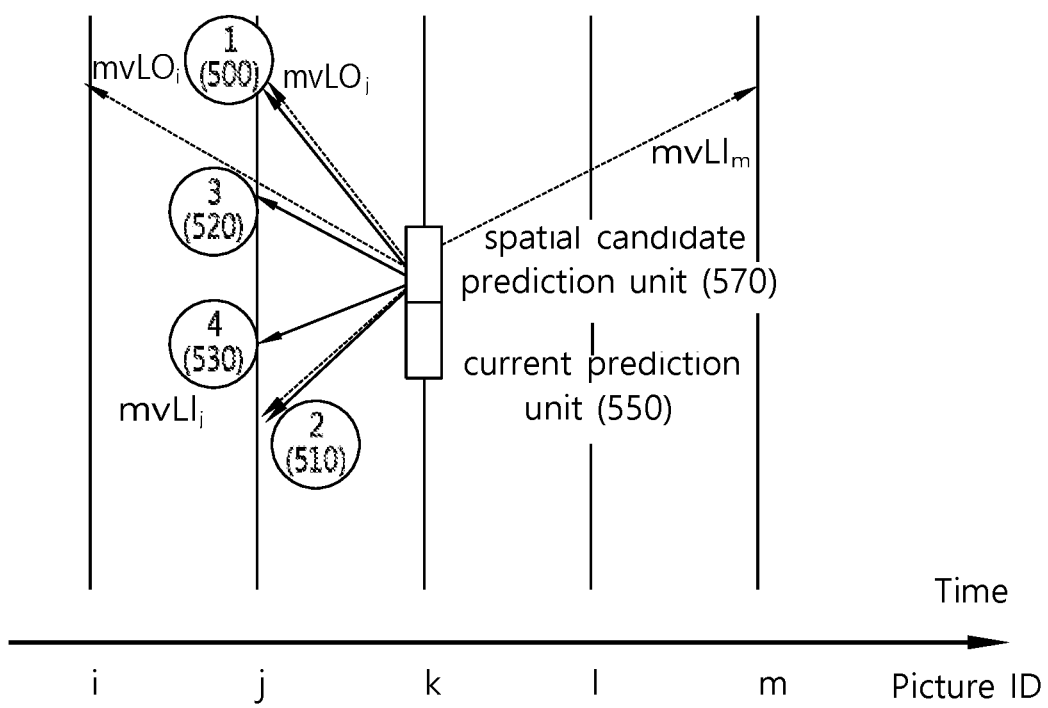
FIG. 5 illustrates a method of classifying motion vectors of a spatial candidate prediction units through relationship between a motion vector of a current prediction unit and the motion vectors of the spatial candidate prediction units.

FIG. 5 illustrates a method of classifying motion vectors of spatial candidate prediction units through relationship between a motion vector of a current prediction unit and the motion vectors of the spatial candidate prediction units.

Referring to FIG. 5, a motion vector of the spatial candidate prediction unit derived from the same reference frame and the same reference picture list as those of the current prediction unit is defined as a first motion vector 500. Referring to FIG. 5, defining a reference picture of the current prediction unit 550 as a j picture and a reference picture list including the j picture as an L0 list, a reference picture indicated by the vector 500 of the spatial candidate prediction unit 570 is a j picture and a reference picture list including the j picture is the L0 list, and accordingly the motion vector of the spatial candidate prediction unit 570 and the motion vector of the current prediction unit have the same reference picture and the same reference picture list.

As such, a motion vector derived from the same reference frame and the same list as those of the current prediction unit is defined as the first motion vector 500.

A motion vector of the spatial candidate prediction unit 570 having the same reference frame as that of the current prediction unit 550 but being derived from a different reference picture list from that of the current prediction unit 550 is defined as a second motion vector 510. Defining a reference picture of the current prediction unit 550 as a j picture and a reference picture list including the j picture as an L0 list, a reference picture indicated by the vector of the spatial candidate prediction unit 570 is a j picture and a reference picture list including the j picture is an L1 list, and accordingly the motion vector 510 of the spatial candidate prediction unit 570 and the motion vector of the current prediction unit have the same reference picture but different reference picture lists. As such, a motion vector having the same reference frame as that of the current prediction unit but being derived from a different list from that of the current prediction unit is defined as the second motion vector 510.

A motion vector of the spatial candidate prediction unit having a different reference frame as that of the current prediction unit but being derived from the same reference picture list as that of the current prediction unit is defined as a third motion vector 520. Defining a reference picture of the current prediction unit 550 as a j picture and a reference picture list including the j picture as an L0 list, a reference picture indicated by the vector 520 of the spatial candidate prediction unit 570 is an i picture and a reference picture list including the i picture is the L0 list, and accordingly the motion vector of the spatial candidate prediction unit and the motion vector of the current prediction unit have different reference pictures but the same reference picture list. As such, a motion vector having a different reference frame from that of the current prediction unit 550 but being derived from the same list as that of the current prediction unit 550 is defined as the third motion vector 520. Since the third motion vector 520 has a different reference picture from that of the current prediction unit, the third motion vector 520 may be scaled based on the reference picture of the current prediction unit to be included in a motion vector predictor candidate list when the motion vector of the spatial candidate prediction unit is used.

A motion vector of the spatial candidate prediction unit 570 derived from a different reference frame and a different reference picture list from those of the current prediction unit 550 is defined as a fourth motion vector 530. Defining a reference picture of the current prediction unit 550 as a j picture and a reference picture list including the j picture as an L0 list, a reference picture indicated by the vector 530 of the spatial candidate prediction unit 570 is an m picture and a reference picture list including the m picture is an L1 list, and accordingly the motion vector of the spatial candidate prediction unit and the motion vector of the current prediction unit have different reference pictures and different reference picture lists. As such, a motion vector derived from a different reference frame and a different reference picture list from those of the current prediction unit is defined as the fourth motion vector 530. Since the fourth motion vector 530 also has a different reference picture from that of the current prediction unit, the fourth motion vector 530 may be scaled based on the reference picture of the current prediction unit to be included in a motion vector predictor candidate list when the motion vector of the spatial candidate prediction unit is used.

As described above, the motion vectors of the spatial candidate prediction unit may be classified into the first to fourth motion vectors based on the reference frame and the reference picture list of the current prediction unit. The method of classifying the motion vectors of the spatial candidate prediction units into the first to fourth motion vectors may be used to determine which of the motion vectors of the spatial candidate prediction units is preferentially used as a motion vector predictor candidate, which will be described.

Figure 6:
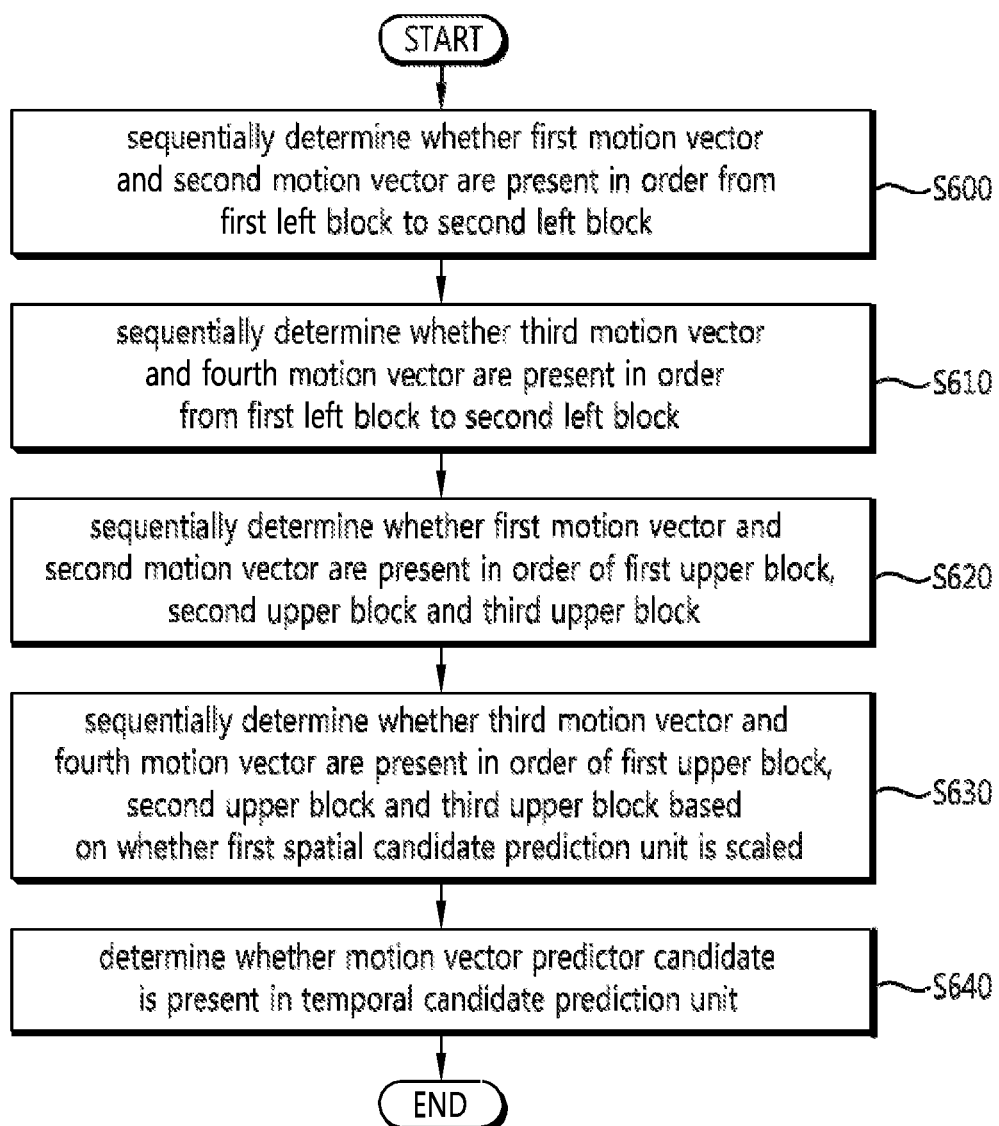
FIG. 6 is a flowchart illustrating a method of deriving spatial candidate prediction group availability information and temporal candidate prediction unit availability information according to an exemplary embodiment of the present invention.

FIG. 6 is a flowchart illustrating a method of deriving spatial candidate prediction group availability information and temporal candidate prediction unit availability information according to an exemplary embodiment of the present invention.

FIG. 6 illustrates the method of deriving the spatial candidate prediction group availability information and the method of deriving the temporal candidate prediction unit availability information described above with reference to S400 to S420 of FIG. 4.

FIG. 6 is a flowchart schematically illustrating a method of deriving availability information and a motion vector predictor candidate.

Referring to FIG. 6, presence of a first motion vector and a second motion vector is sequentially determined in order from the first left block to the second left block (S600).

In operation S600, it is determined whether the first motion vector is present in the first left block, and when no first motion vector is present in the first left block, it is determined whether the second motion vector is present in the first left block.

Subsequently, it is determined whether the first motion vector is present in the second left block, and when no first motion vector is present in the second left block, it is determined whether the second motion vector is present in the second left block.

As a result of sequential determination in S600, when a motion vector meeting conditions is present, a subsequent determination procedure may be omitted and the motion vector may be included in the motion vector predictor candidate list as a motion vector predictor candidate. Further, the first spatial candidate prediction group availability information may be set to 1 to indicate that the motion vector predictor candidate is present in the first spatial candidate prediction group. 1 is a random binary number for indicating whether the motion vector predictor candidate is present, which may be replaced by another binary code. In the present embodiment, binary numbers 1 and 0 to represent predetermined information are selected at random, which may be replaced by another binary code or a code generated by an alternative method.

Presence of a third motion vector and a fourth motion vector are sequentially determined in order from the first left block to the second left block (S610).

When the availability information is not set to 1 through S600, that is, when no vector meeting the conditions is not found as a result of sequentially determining whether the first motion vector and the second motion vector are present in order from the first left block to the second left block, a motion vector predictor candidate may be derived in S610.

That is, in S610, it is determined whether the third motion vector is present in the first left block, and when no third motion vector is present in the first left block, it is determined whether the fourth motion vector is present in the first left block.

Subsequently, it is determined whether the third motion vector is present in the second left block, and when no third motion vector is present in the second left block, it is determined whether the fourth motion vector is present in the second left block.

When a motion vector meeting the conditions is present as a result of sequential determination in S610, the first spatial candidate prediction group availability information may be set to 1 and a subsequent procedure of determining whether a motion vector is present may be omitted.

As described above, the third motion vector and the fourth motion vector indicate different reference pictures from that of the current prediction unit and thus may be included in the motion vector predictor candidate list after scaling.

When the third motion vector and the fourth motion vector are determined to be present in the first left block or the second left block in S610, information indicating whether scaling is performed (hereinafter, referred to as "scaling information") is set to 1 to show that scaling is carried out on the motion vector predictor candidate once. In the motion prediction method according to the exemplary embodiment of the present invention, a number of scaling times for generating a motion vector predictor candidate may be limited. For example, when the number of scaling times for generating the motion vector predictor candidate is limited to 1, flag information representing whether scaling is performed indicates that scaling is carried out so that redundant scaling is not conducted. When the number of scaling times is limited, complexity in deriving a motion vector predictor candidate may be remarkably reduced.

When a motion vector meeting the conditions is present as a result of sequential determination in S610, the motion vector may include in the motion vector predictor candidate list via scaling and the first spatial candidate prediction group availability information may be set to 1.

One motion vector predictor candidate may be derived from the first spatial candidate prediction group via S400 of FIG. 4 based on the first spatial candidate prediction group availability information set through S600 and S610.

Presence of the first motion vector and the second motion vector are sequentially determined in order of the first upper block, the second upper block and the third upper block (S620).

In operation S620, it is determined whether the first motion vector is present in the first upper block, and when no first motion vector is present in the first upper block, it is determined whether the second motion vector is present in the first upper block.

Subsequently, it is determined whether the first motion vector is present in the second upper block, and when no first motion vector is present in the second upper block, it is determined whether the second motion vector is present in the second upper block.

Next, it is determined whether the first motion vector is present in the third upper block, and when no first motion vector is present in the third upper block, it is determined whether the second motion vector is present in the third upper block.

When a motion vector meeting conditions is present as a result of sequential determination in S620, a subsequent determination procedure may be omitted. The derived motion vector may be included in the motion vector predictor candidate list, and the second spatial candidate prediction group availability information may be set to 1 to indicate that the motion vector predictor candidate is present in the first spatial candidate prediction group.

Presence of the third motion vector and the fourth motion vector are sequentially determined in order of the first upper block, the second upper block and the third upper block based on whether the first spatial candidate prediction unit is scaled (S630).

When the second spatial candidate prediction group availability information is not set to 1 through S620, a motion vector predictor candidate may be derived in S630. As described above, if the number of scaling times is limited and scaling is carried out the limited number of scaling times in driving the motion vector predictor candidate from the first spatial candidate prediction group, operation S630 may not be carried out. For example, when the scaling information is represented as 1 in S610, operation S630 may not be carried out. When scaling is available in S630, it is determined whether the third motion vector is present in the first upper block, and no third motion vector is present in the first upper block, it is determined whether the fourth motion vector is present in the first upper block in S630.

Subsequently, it is determined whether the third motion vector is present in the second upper block, and when no third motion vector is present in the second upper block, it is determined whether the fourth motion vector is present in the second upper block.

Next, it is determined whether the third motion vector is present in the third upper block, and when no third motion vector is present in the third upper block, it is determined whether the fourth motion vector is present in the third upper block.

As described above, the third motion vector and the fourth motion vector indicate different reference pictures from that of the current prediction unit and thus may be included in the motion vector predictor candidate list after scaling.

When a motion vector meeting the conditions is present as a result of sequential determination in S630, the motion vector may be included in the motion vector predictor candidate list and the second spatial candidate prediction group availability information may be set to 1.

One motion vector predictor candidate may be derived from the first spatial candidate prediction group via S410 of FIG. 4 based on the second spatial candidate prediction group availability information set through S620 and S630.

When the derived motion vector predictor candidate via S620 and S630 is the same as the motion vector predictor candidate derived from the first spatial candidate prediction group in S600 and S610, the derived motion vector predictor candidate may be determined not to be available.

For instance, although the first motion vector is present in the first upper block in S620, if the motion vector of the first upper block is the same as the motion vector predictor candidate of the first spatial candidate prediction group derived via S600 and S610, the motion vector of the first upper block may not be selected as a motion vector predictor candidate.

Alternatively, the procedure of determining whether the motion vector predictor candidate derived in S620 and S630 is the same as the motion vector predictor candidate of the first spatial candidate prediction group derived via S600 and S610 may not be carried out in S620 and S630, but be conducted by removing the same motion vector predictor candidate from the motion vector predictor candidate list among the motion vector predictor candidate of the first spatial candidate prediction group, the motion vector predictor candidate of the second spatial candidate prediction group and a motion vector predictor candidate of a temporal candidate prediction unit, which are included in the motion vector predictor candidate list, after the motion vector is derived from the temporal candidate prediction unit in S640, which will be described below.

It is determined whether the motion vector predictor candidate is present in the temporal candidate prediction unit (S640).

A colocated picture including the temporal candidate prediction unit may be a first picture of a reference picture list 1 of the current picture or a first picture of a reference picture list 0 of the current picture based on predetermined flag information. The temporal candidate prediction unit using the two reference picture lists may use only a preferential motion vector present in one list as the motion vector predictor candidate based on the predetermined flag information. When a distance between the current picture and a reference picture for the current picture is different from a distance between the picture including the temporal candidate prediction unit and a reference picture for the temporal candidate prediction unit, scaling may be carried out on the motion vector predictor candidate derived from the temporal candidate prediction unit.

When the motion vector predictor candidate can be derived from the temporal candidate prediction unit, the temporal candidate prediction unit availability information may be set to 1.

Figure 7:
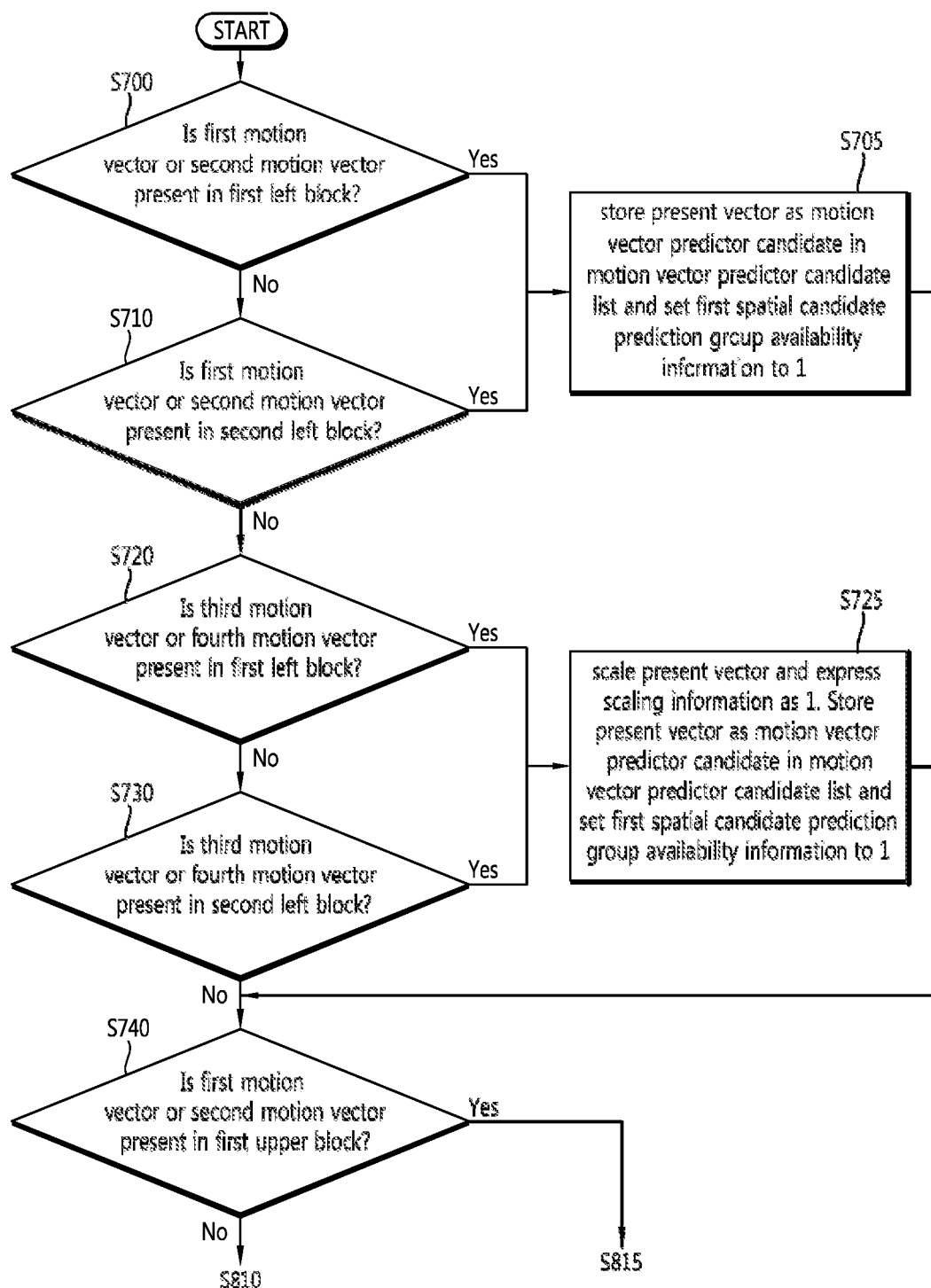
FIG. 7 is a flowchart illustrating a method of deriving a motion vector predictor candidate from a first spatial candidate prediction group according to an exemplary embodiment.
Figure 8:
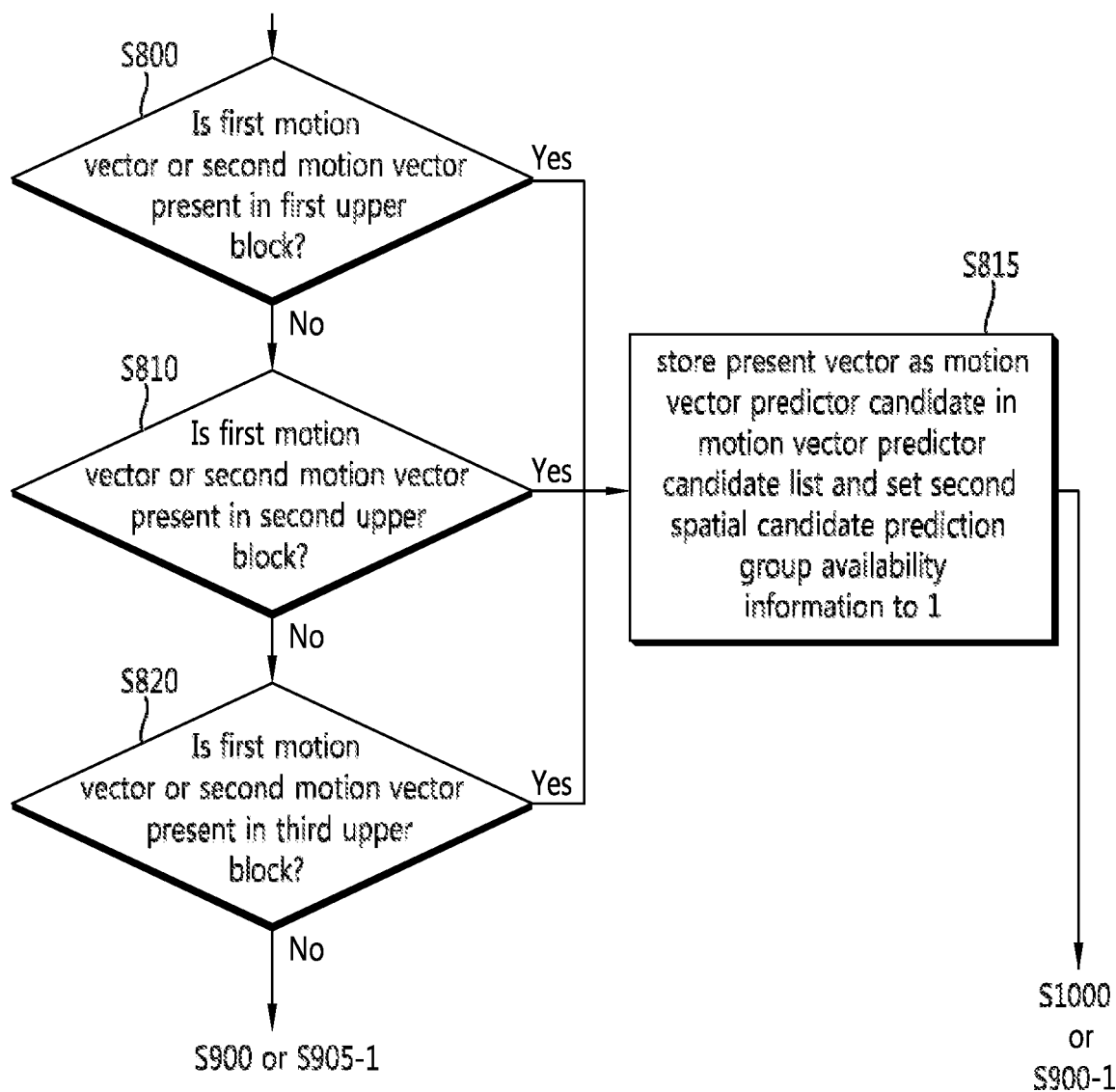
FIG. 8 is a flowchart illustrating a method of deriving a motion vector predictor candidate (first motion vector and second motion vector) from a second spatial candidate prediction group according to an exemplary embodiment.
Figure 9:
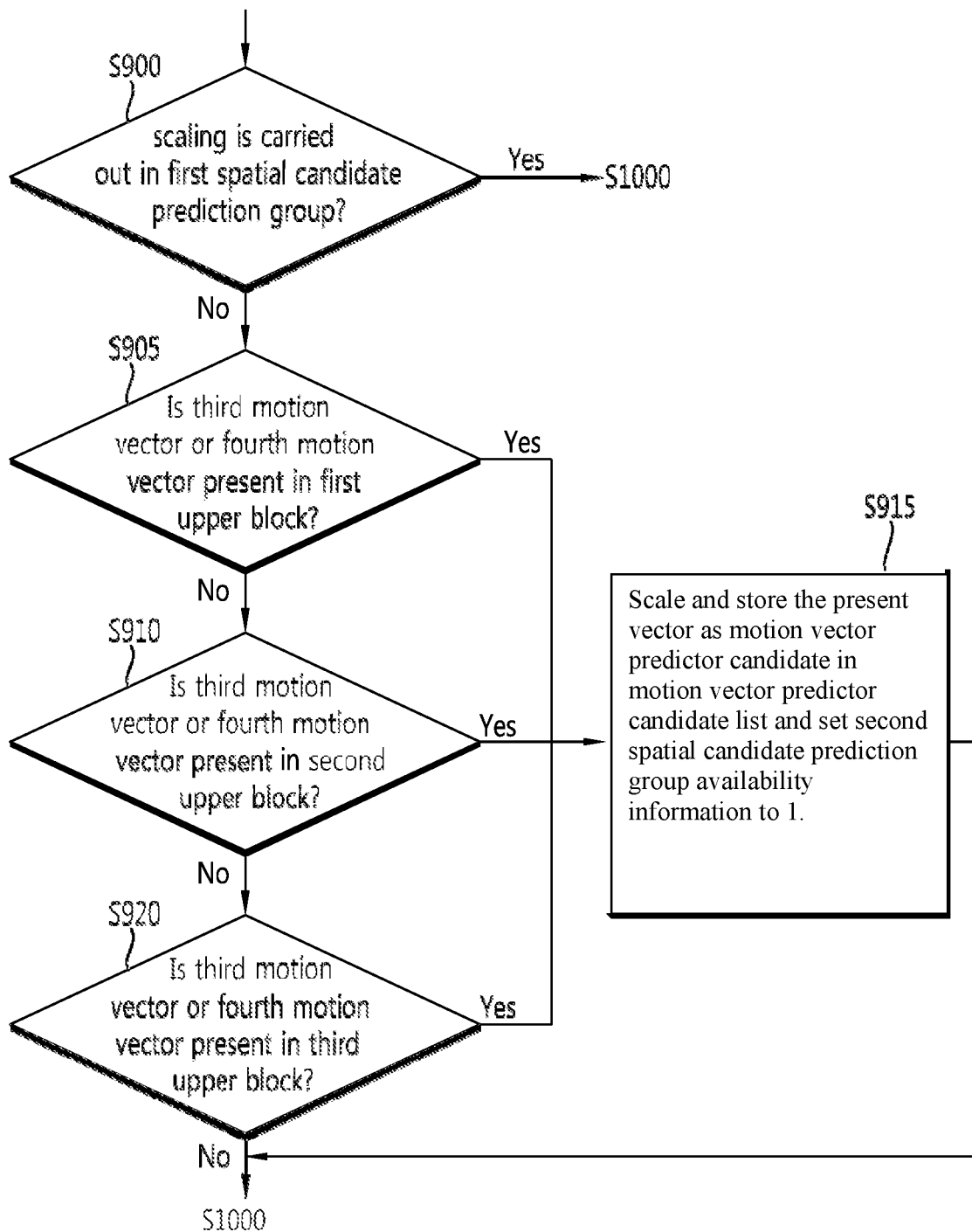
FIG. 9 is a flowchart illustrating a method of deriving a motion vector predictor candidate (third motion vector and fourth motion vector) from the second spatial candidate prediction group according to an exemplary embodiment.

FIGS. 7 to 9 are flowcharts illustrating methods of constructing motion vector predictor candidate list according to exemplary embodiments of the present invention.

FIG. 7 is a flowchart illustrating a method of deriving a motion vector predictor candidate from a first spatial candidate prediction group according to an exemplary embodiment.

Referring to FIG. 7, it is determined whether a first motion vector or a second motion vector is present in a first left block (S700).

When the first motion vector or the second motion vector is present in the first left block, the present vector is included in a motion vector predictor candidate list as a motion vector predictor candidate, first spatial candidate prediction group availability information is set to 1 (S705), and it is determined whether the first motion vector or the second motion vector is present in a first upper block (S740).

When the first motion vector or the second motion vector is not present in the first left block, it is determined whether the first motion vector or the second motion vector is present in a second left block (S710).

When the first motion vector or the second motion vector is present in the second left block, the present vector is included in the motion vector predictor candidate list as a motion vector predictor candidate, the first spatial candidate prediction group availability information is set to 1 (S705), and it is determined whether the first motion vector or the second motion vector is present in the first upper block (S740).

When the first motion vector or the second motion vector is not present in the second left block, it is determined whether a third motion vector or a fourth motion vector is present in the first left block (S720).

When the third motion vector or the forth motion vector is present in the first left block, the present vector is scaled (scaling information is expressed as 1) and included in the motion vector predictor candidate list as a motion vector predictor candidate and the first spatial candidate prediction group availability information is set to 1 (S725). It is determined whether the first motion vector or the second motion vector is present in the first upper block (S740).

When the third motion vector or the fourth motion vector is not present in the first left block, it is determined whether the third motion vector or the fourth motion vector is present in the second left block (S730).

When the third motion vector or the forth motion vector is present in the second left block, the present vector is scaled (scaling information is expressed as 1) and included in the motion vector predictor candidate list as a motion vector predictor candidate and the first spatial candidate prediction group availability information is set to 1 (S725). It is determined whether the first motion vector or the second motion vector is present in the first upper block (S740).

FIG. 8 is a flowchart illustrating a method of deriving a motion vector predictor candidate (the first motion vector and the second motion vector) from a second spatial candidate prediction group according to an exemplary embodiment.

Referring to FIG. 8, it is determined whether the first motion vector or the second motion vector is present in the first upper block (S800).

Figure 10:
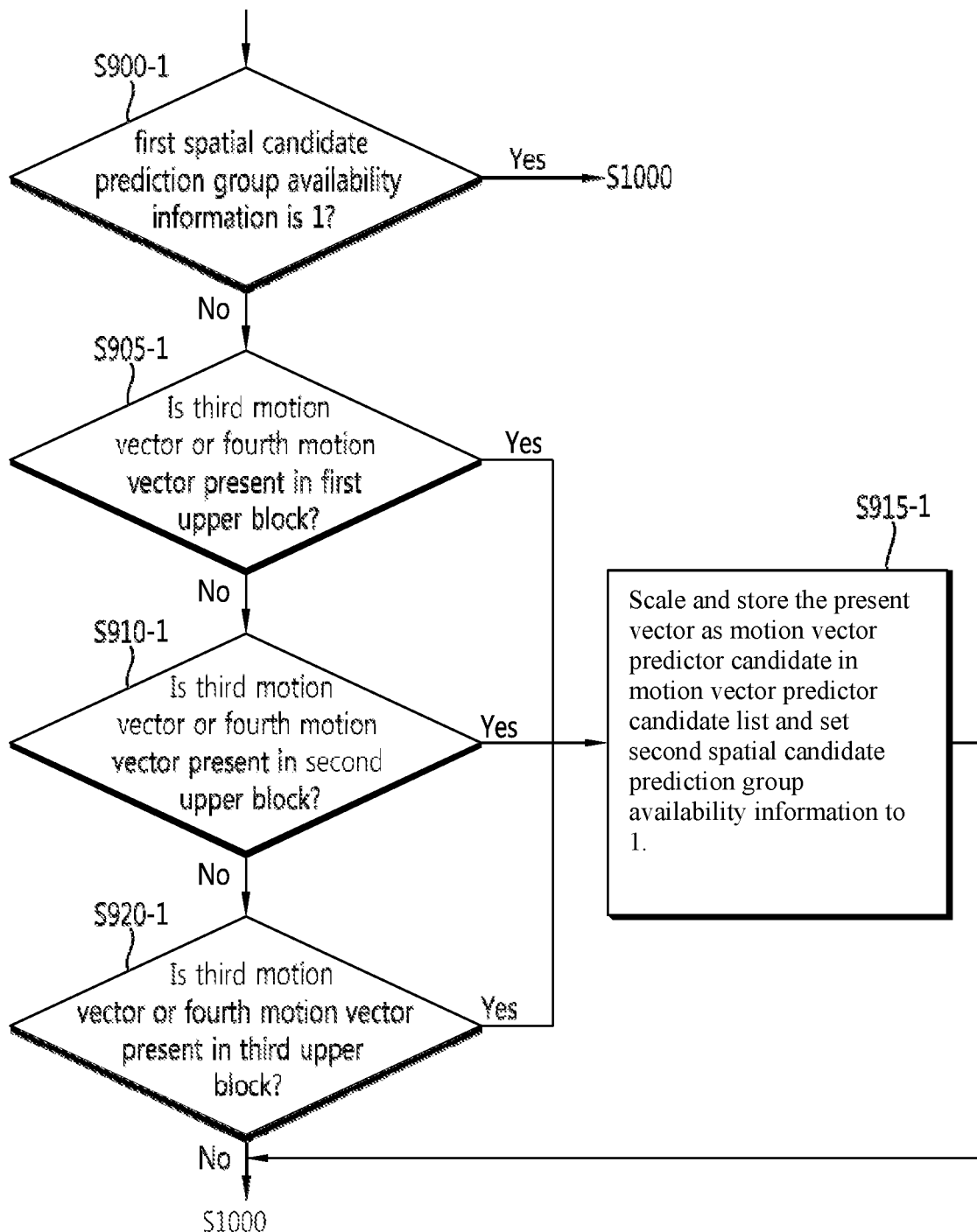
FIG. 10 is a flowchart illustrating a method of deriving a motion vector predictor candidate (the third motion vector and the fourth motion vector) from the second spatial candidate prediction group according to another exemplary embodiment.

When the first motion vector or the second motion vector is present in the first upper block, the present vector is included in the motion vector predictor candidate list, second spatial candidate prediction group availability information is set to 1 (S815), and it is determined whether a motion vector predictor candidate of a temporal candidate prediction unit is present (S1000 of FIG. 10).

When the first motion vector or the second motion vector is not present in the first upper block, it is determined whether the first motion vector or the second motion vector is present in the second upper block (S910).

When the first motion vector or the second motion vector is present in the second upper block, the present vector is included in the motion vector predictor candidate list, the second spatial candidate prediction group availability information is set to 1 (S915), and it is determined whether the motion vector predictor candidate of the temporal candidate prediction unit is present (S1000 of FIG. 10).

When the first motion vector or the second motion vector is not present in the second upper block, it is determined whether the first motion vector or the second motion vector is present in the third upper block (S820).

When the first motion vector or the second motion vector is present in the third upper block, the present vector is included in the motion vector predictor candidate list, the second spatial candidate prediction group availability information is set to 1 (S815), and it is determined whether the motion vector predictor candidate of the temporal candidate prediction unit is present (S1000 of FIG. 10).

FIG. 9 is a flowchart illustrating a method of deriving a motion vector predictor candidate (the third motion vector and the fourth motion vector) from the second spatial candidate prediction group according to an exemplary embodiment.

Referring to FIG. 9, when the first motion vector or the second motion vector is not present in the third upper block, it is determined whether scaling is carried out in the first spatial candidate prediction group (S900). When scaling is carried out in the first spatial candidate prediction group, it is determined whether the motion vector predictor candidate of the temporal candidate prediction unit is present, without deriving an additional motion vector predictor candidate from the second spatial candidate prediction group (S1000). When scaling is carried out in the first spatial candidate prediction group, it is determined whether the third motion vector or the fourth motion vector is present in the first upper block (S905).

That is, the number of scaling times is limited, thereby deriving the motion vector predictor candidate.

When the third motion vector or the fourth motion vector is present in the first upper block, the present vector is scaled and included in the motion vector predictor candidate list, the second spatial candidate prediction group availability information is set to 1 (S915), and it is determined whether the motion vector predictor candidate of the temporal candidate prediction unit is present (S1000 of FIG. 10).

When the third motion vector or the fourth motion vector is not present in the first upper block, it is determined whether the third motion vector or the fourth motion vector is present in the second upper block (S910).

When the third motion vector or the fourth motion vector is present in the second upper block, the present vector is scaled and included in the motion vector predictor candidate list, the second spatial candidate prediction group availability information is set to 1 (S915), and it is determined whether the motion vector predictor candidate of the temporal candidate prediction unit is present (S1000 of FIG. 10).

When the third motion vector or the fourth motion vector is not present in the second upper block and scaling is not carried out in the first spatial candidate prediction group (scaling information is expressed as 0), it is determined whether the third motion vector or the fourth motion vector is present in the third upper block (S920).

When the third motion vector or the fourth motion vector is present in the third upper block, the present vector is scaled and included in the motion vector predictor candidate list, the second spatial candidate prediction group availability information is set to 1 (S915), and it is determined whether the motion vector predictor candidate of the temporal candidate prediction unit is present (S1000 of FIG. 10).

FIG. 10 is a flowchart illustrating a method of deriving a motion vector predictor candidate from the second spatial candidate prediction group according to another exemplary embodiment of the present invention.

In FIG. 10, unlike in FIG. 9, when a motion vector predictor candidate is not derived from the first spatial candidate prediction group, even though the first motion vector or the second motion vector is derived from the second spatial candidate prediction group as a motion vector predictor candidate, it is additionally determined whether the third motion vector or the fourth motion vector is present in the second spatial candidate prediction group and the present motion vector may be used as a motion vector predictor candidate.

That is, when the first motion vector or the second motion vector is derived as the motion vector predictor candidate from the second spatial candidate prediction group (S815) in FIG. 8, it is determined whether the first spatial candidate prediction group availability information is 1 (S900-1).

That is, when the first motion vector or the second motion vector is derived as the motion vector predictor candidate from the second spatial candidate prediction group and the first spatial candidate prediction group availability information is set to 1, if a motion vector predictor candidate is not derived from the first spatial candidate prediction group as a result of determination of the first spatial candidate prediction group availability information, additional scanning is carried out to determine whether the third motion vector or the fourth motion vector is present in the second spatial candidate prediction group. To conduct scanning, the second spatial candidate prediction group availability information set in S815 may be set to 0 until a motion vector meeting the conditions is derived during scanning in S905-1, S910-1 and S920-1.

When the first motion vector or the second motion vector is not derived as a motion vector predictor candidate from the second spatial candidate prediction group (S820 of FIG. 8), it is determined whether the third motion vector or the fourth motion vector is present in the first upper block in S905-1.

Figure 11:
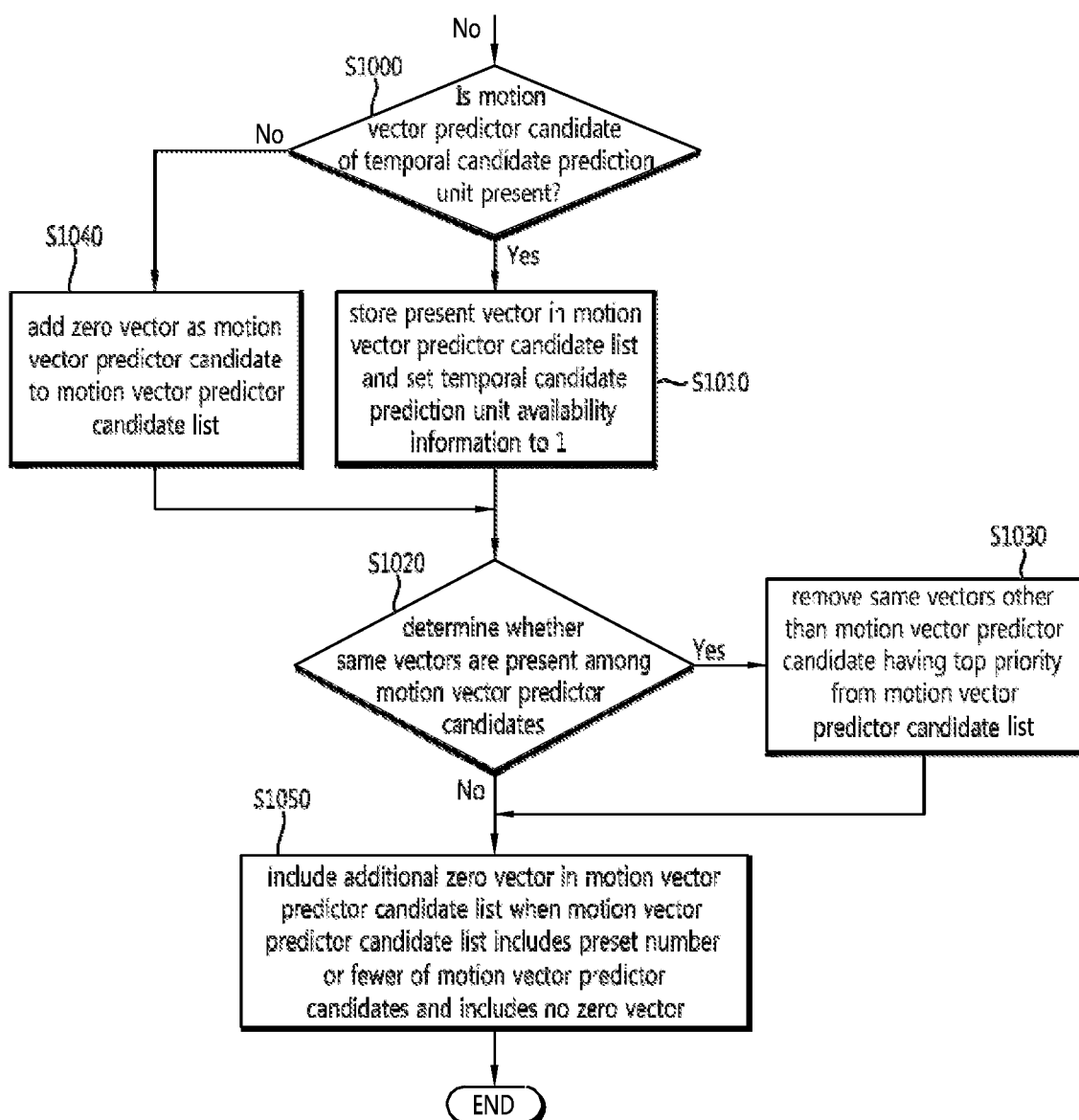
FIG. 11 is a flowchart illustrating a method of deriving a motion vector predictor candidate of a temporal candidate prediction group according to an exemplary embodiment of the present invention.

FIG. 11 is a flowchart illustrating a method of deriving the motion vector predictor candidate of the temporal candidate prediction group according to an exemplary embodiment of the present invention.

Referring to FIG. 11, it is determined whether the motion vector predictor candidate of the temporal candidate prediction unit is present (S1000).

When the motion vector predictor candidate of the temporal candidate prediction unit is present, the present vector is included in the motion vector predictor candidate list and temporal candidate prediction unit availability information is set to 1 (S1010).

In the case of the motion vector predictor candidate of the temporal candidate prediction unit, whether to conduct scaling may change based on a distance between a picture including the current temporal candidate prediction unit and a reference picture that the temporal candidate prediction unit refers to.

It is determined whether the same motion vector predictor candidate is present among motion vector predictor candidates included in the motion vector predictor candidate list (S1020).

When the temporal motion vector predictor candidate is not present and the motion vector predictor candidate is not present in the motion vector predictor candidate list, a zero vector is added as a motion vector predictor candidate to the motion vector predictor candidate list (S1040).

When the same motion vector predictor candidate is present among the motion vector predictor candidates included in the motion vector predictor candidate list, identical vectors other than a motion vector predictor candidate having top priority are removed from the motion vector predictor candidate list (S1030).

If the motion vector predictor candidate list is configured to include a fixed number of motion vector predictor candidates, the following operation may be additionally carried out.

When the motion vector predictor candidate list includes a preset number or fewer of motion vector predictor candidates and includes no zero vector, a zero vector is added as a motion vector predictor candidate to the motion vector predictor candidate list (S1050).

As described above, when a motion vector predictor candidate is derived from the second spatial candidate prediction group, a procedure of determining whether the motion vector predictor candidate is the same as the motion vector predictor candidate derived from the first spatial candidate prediction group may be carried out in the deriving the motion vector predictor candidate from the second spatial candidate group illustrated in FIGS. 8 and 9.

The operations illustrated in FIGS. 6 to 10, which describe the process of deriving the motion vector predictor candidates, may not necessarily be carried out in the same sequence as mentioned above but be conducted in a parallel manner. In the process of deriving the motion vector predictor candidates, in which the number of scaling times is limited and a vector to be scaled is preferentially subjected to scanning, the number and locations of first spatial candidate prediction units, the number and locations of second spatial candidate prediction units and locations of temporal candidate prediction units may be changed and modified.

Further, adding an additional vector and limiting the number of motion vector predictor candidates at random may be also changed and modified.

The video encoding method and the video decoding method described above may be carried out by the components of the video encoding apparatus and the video decoding apparatus illustrated in FIGS. 1 and 2.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A picture decoding method for deriving a motion vector of a current block, by a decoding apparatus, the method comprising:
checking a first motion vector predictor (mvp) candidate, wherein the first mvp candidate is checked from a first motion vector of an available block among first neighboring blocks including a lower left block and a left block of the current block, and wherein scaling for the first motion vector of the available block is performed for the first mvp candidate based on a case that a reference picture of the available block is different from a reference picture of the current block;
setting a value of scaling information, wherein the value of the scaling information is equal to 1 when the scaling for the first motion vector of the available block is performed for the first mvp candidate;
checking a second mvp candidate, wherein the second mvp candidate is checked from a second motion vector of a specific block among second neighboring blocks including an upper right block, an upper block, and an upper left block of the current block, and wherein the second motion vector of the specific block which is available among the second neighboring blocks or a scaled motion vector of the second motion vector is used for the second mvp candidate;
checking a temporal mvp candidate from a temporal neighboring block to the current block using determination on whether the temporal neighboring block is available for predicting the motion vector of the current block;
constructing a mvp candidates list based on at least one of the first mvp candidate, the second mvp candidate or the temporal mvp candidate; and
deriving the motion vector for the current block based on an mvp for the current block, wherein the mvp for the current block is selected from mvp candidates in the mvp candidates list,
wherein the scaling information is related to whether the scaled motion vector for the second mvp candidate is available, wherein an initial value of the scaling information is equal to 0,
wherein, when the value of the scaling information is equal to 0 and the reference picture of the specific block is different from the reference picture of the current block, the scaled motion vector is used for the second mvp candidate, and
wherein, when the value of the scaling information is equal to 1 and the reference picture of the specific block is different from the reference picture of the current block, the scaled motion vector is not used for the second mvp candidate.

2. The method of claim 1, wherein, for the first mvp candidate and the second mvp candidate, motion vectors are scaled once or less, and
wherein the second motion vector of the specific block is not scaled for the second mvp candidate when the first motion vector of the available block from the first neighboring blocks is scaled for the first mvp candidate.

3. The method of claim 1, wherein, for the first mvp candidate and the second mvp candidate, a maximum number of scaling processes for the first motion vector of the available block from the first neighboring blocks and the second motion vector of the specific block from the second neighboring blocks is 1.

4. The method of claim 1, wherein the second mvp candidate is derived by scaling the second motion vector of the specific block when the first mvp candidate which is available is not derived for the first mvp candidate or the scaling is not applied for the first mvp candidate.

5. The method of claim 1, wherein, for the first mvp candidate, availability check for the first neighboring blocks is performed based on a first scan order, wherein the first scan order is in order from the lower left block to the left block, and
wherein, for the second mvp candidate, availability check for the second neighboring blocks is performed based on a second scan order, wherein the second scan order is in order from the upper right block, to the upper block, to the upper left block.

6. The method of claim 5, wherein the value of the scaling information is equal to 0 when the first mvp candidate which is available is not derived or the scaling is not applied for the first mvp candidate.

7. The method of claim 5, wherein, for the first mvp candidate, the first motion vector of the available block from the first neighboring blocks is used as the first mvp candidate when a reference picture of the available block is same as the reference picture of the current block, and
wherein the scaling is performed on the motion vector of the available block when the reference picture of the available block is different from the reference picture of the current block and the scaling information is equal to 0.

8. A picture encoding method for deriving a motion vector of a current block, by an encoding apparatus, the method comprising:
checking a first motion vector predictor (mvp) candidate, wherein the first mvp candidate is checked from a first motion vector of an available block among first neighboring blocks including a lower left block and a left block of the current block, and wherein scaling for the first motion vector of the available block is performed for the first mvp candidate based on a case that a reference picture of the available block is different from a reference picture of the current block;
setting a value of scaling information, wherein the value of the scaling information is equal to 1 when the scaling for the first motion vector of the available block is performed for the first mvp candidate;
checking a second mvp candidate, wherein the second mvp candidate is checked from a second motion vector of a specific block among second neighboring blocks including an upper right block, an upper block, and an upper left block of the current block, and wherein the second motion vector of the specific block which is available among the second neighboring blocks or a scaled motion vector of the second motion vector is used for the second mvp candidate;

checking a temporal mvp candidate from a temporal neighboring block to the current block using determination on whether the temporal neighboring block is available for predicting the motion vector of the current block;

constructing a mvp candidates list based on at least one of the first mvp candidate, the second mvp candidate or the temporal mvp candidate; and deriving the motion vector for the current block based on an mvp for the current block, wherein the mvp for the current block is selected from mvp candidates in the mvp candidates list, wherein the scaling information is related to whether the scaled motion vector for the second mvp candidate is available, wherein an initial value of the scaling information is equal to 0, wherein, when the value of the scaling information is equal to 0 and the reference picture of the specific block is different from the reference picture of the current block, the scaled motion vector is used for the second mvp candidate, and wherein, when the value of the scaling information is equal to 1 and the reference picture of the specific block is different from the reference picture of the current block, the scaled motion vector is not used for the second mvp candidate.

9. The method of claim 8, wherein, for the first mvp candidate and the second mvp candidate, motion vectors are scaled once or less, and wherein the second motion vector of the specific block is not scaled for the second mvp candidate when the first motion vector of the available block from the first neighboring blocks is scaled for the first mvp candidate.

10. The method of claim 8, wherein, for the first mvp candidate and the second mvp candidate, a maximum number of scaling processes for the first motion vector of the available block from the first neighboring blocks and the second motion vector of the specific block from the second neighboring blocks is 1.

11. The method of claim 8, wherein the second mvp candidate is derived by scaling the second motion vector of the specific block when the first mvp candidate which is available is not derived for the first mvp candidate or the scaling is not applied for the first mvp candidate.

12. The method of claim 8, wherein, for the first mvp candidate, availability check for the first neighboring blocks is performed based on a first scan order, wherein the first scan order is in order from the lower left block to the left block, and wherein, for the second mvp candidate, availability check for the second neighboring blocks is performed based on a second scan order, wherein the second scan order is in order from the upper right block, to the upper block, to the upper left block.

13. The method of claim 12, wherein the value of the scaling information is equal to 0 when the first mvp candidate which is available is not derived or the scaling is not applied for the first mvp candidate.

14. The method of claim 12, wherein, for the first mvp candidate, the first motion vector of the available block from the first neighboring blocks is used as the first mvp candidate when a reference picture of the available block is same as the reference picture of the current block, and wherein the scaling is performed on the motion vector of the available block when the reference picture of the available block is different from the reference picture of the current block and the scaling information is equal to 0.

15. A non-transitory decoder-readable storage medium storing encoded picture information generated by performing the steps of:

checking a first motion vector predictor (mvp) candidate, wherein the first mvp candidate is checked from a first motion vector of an available block among first neighboring blocks including a lower left block and a left block of the current block, and wherein scaling for the first motion vector of the available block is performed for the first mvp candidate based on a case that a reference picture of the available block is different from a reference picture of the current block;

setting a value of scaling information, wherein the value of the scaling information is equal to 1 when the scaling for the first motion vector of the available block is performed for the first mvp candidate;

checking a second mvp candidate, wherein the second mvp candidate is checked from a second motion vector of a specific block among second neighboring blocks including an upper right block, an upper block, and an upper left block of the current block, and wherein the second motion vector of the specific block which is available among the second neighboring blocks or a scaled motion vector of the second motion vector is used for the second mvp candidate;

checking a temporal mvp candidate from a temporal neighboring block to the current block using determination on whether the temporal neighboring block is available for predicting the motion vector of the current block;

constructing a mvp candidates list based on at least one of the first mvp candidate, the second mvp candidate or the temporal mvp candidate;

deriving the motion vector for the current block based on an mvp for the current block, wherein the mvp for the current block is selected from mvp candidates in the mvp candidates list; and encoding picture information including information related to the motion vector for the current block, wherein the scaling information is related to whether the scaled motion vector for the second mvp candidate is available, wherein an initial value of the scaling information is equal to 0, wherein, when the value of the scaling information is equal to 0 and the reference picture of the specific block is different from the reference picture of the current block, the scaled motion vector is used for the second mvp candidate, and wherein, when the value of the scaling information is equal to 1 and the reference picture of the specific block is different from the reference picture of the current block, the scaled motion vector is not used for the second mvp candidate.

* * * * *